US008418183B2

(12) United States Patent
Nishimura

(10) Patent No.: US 8,418,183 B2
(45) Date of Patent: Apr. 9, 2013

(54) RESOURCE INFORMATION COLLECTION AND DELIVERY METHOD AND SYSTEM

(75) Inventor: Shoji Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 1724 days.

(21) Appl. No.: 11/192,054

(22) Filed: Jul. 29, 2005

(65) Prior Publication Data

US 2006/0026556 A1 Feb. 2, 2006

(30) Foreign Application Priority Data

Jul. 29, 2004 (JP) ................................. 2004-221109

(51) Int. Cl.
*G06F 9/50* (2006.01)
*G06F 15/173* (2006.01)

(52) U.S. Cl.
USPC ............................ 718/104; 709/223; 709/226

(58) Field of Classification Search ................... 709/226
See application file for complete search history.

(56) References Cited

U.S. PATENT DOCUMENTS

| 6,633,873 | B1 | 10/2003 | Nakamura | |
|---|---|---|---|---|
| 6,862,619 | B1 | 3/2005 | Sugauchi et al. | |
| 6,954,931 | B2 * | 10/2005 | Shetty et al. | 718/104 |
| 7,644,408 | B2 * | 1/2010 | Kroening | 718/102 |
| 2001/0039581 | A1 * | 11/2001 | Deng et al. | 709/226 |
| 2003/0163807 | A1 * | 8/2003 | Drake et al. | 717/174 |
| 2004/0225711 | A1 * | 11/2004 | Burnett et al. | 709/201 |
| 2005/0234937 | A1 * | 10/2005 | Ernest et al. | 707/100 |

FOREIGN PATENT DOCUMENTS

| JP | 10-207847 A | 8/1998 |
|---|---|---|
| JP | 2001-084195 A | 3/2001 |
| JP | 2001-145168 A | 5/2001 |
| JP | 2004-094813 | 3/2004 |

OTHER PUBLICATIONS

Gábor Gombás and Zoltán Balaton; "A Flexible Multi-level Grid Monitoring Architecture"; Across Grids 2003, LNCS 2970; p. 214-221; Springer-Verlag; 2004.*
Beulah Kurian Alunkal; Ivana Veljkovic; Gregor Von Laszewski; Kaizar Amin; "Reputation-Based Grid Resource Selection"; In Workshop on Adaptive Grid Middleware; 2003.*
Hélène N. Lim Choi Keung; Justin R. D. Dyson; Stephen A. Jarvis; Graham R. Nudd; "Predicting the Performance of Globus Monitoring and Discovery Service (MDS-2) Queries"; International Conference on Grid Computing; Proceedings of the 4th International Workshop on Grid Computing; p. 176; Year of Publication: 2003.*
Karl Czajkowski, et al.; "Grid Information Services for Distributed Resource Sharing"; Proc. 10th IEEE International Symposium on High-Performance Distributed Computing (HPDC-10) IEEEE Press, 2001; retrieved from the web at http://www.globus.org/research/papers/MDS-HPDC.pdf.
MDS 2.2 User's Guide; Chapters 2-4; The Globus Project; Retrieved from the web at http://www.globus.org/mds/mdsusersguide.pdf.

* cited by examiner

*Primary Examiner* — Qing Wu
(74) *Attorney, Agent, or Firm* — Dickstein Shapiro LLP

(57) ABSTRACT

A resource use device that sends a resource information evaluation expression, which is a criterion for selecting resources, to a resource providing device. The resource providing device evaluates resource information on a resource using the resource information evaluation expression, adds a resource information value, which is the result of evaluation, to resource information and delivers the resource information to the resource use device.

28 Claims, 24 Drawing Sheets

FIG. 10

```
RESOURCE INFORMATION VALUE
STORAGE UNIT 103

RESOURCE PROVIDING DEVICE 120a=80
RESOURCE PROVIDING DEVICE 120b=100
RESOURCE PROVIDING DEVICE 120c=95
RESOURCE PROVIDING DEVICE 120d=70
```

FIG . 14

```
RESOURCE INFORMATION VALUE
HOLDING UNIT 124

RESOURCE R1:1152
RESOURCE R2:712
RESOURCE R3:656
RESOURCE R4:1965
```

FIG. 18

RESOURCE CONFIGURATION
INFORMATION STORAGE UNIT 145

ATTRIBUTE A1:756
    RESOURCE R4

ATTRIBUTE A1:512
    RESOURCE R1
    RESOURCE R2

ATTRIBUTE A1:256
    RESOURCE R3

RESOURCE INFORMATION COLLECTION AND DELIVERY METHOD AND SYSTEM

FIELD OF THE INVENTION

The present invention relates to a resource information collection and delivery method and system for use in grid computing, and more particularly to a method and a system for collecting and delivering widely distributed resource information in a scalable manner with its use in mind.

BACKGROUND OF THE INVENTION

Grid computing is a technology for dynamically sharing geographically and organizationally distributed various types of CPUs, memories, information, and other resources according to the user's demand and provider's policy so that those resources work together to process problems. One of the functions required for such grid computing is a function for collecting and delivering information on resources such as CPU, operating systems (OS), and memories used in grid computing.

An example of a conventional resource information collection and delivery system is described in Non-Patent Document 1 and Non-Patent Document 2.

As shown in FIG. 24, this conventional resource information collection and delivery system comprises a resource use device 300 that has filter expression sending means 301, a resource providing device 320 that has resource information filter means 321 and resource information delivery means 322, and a resource information storage unit 340.

The conventional resource information collection and delivery system with this configuration operates as follows. That is, a filter expression 310 sent from the resource use device 300 to the resource providing device 320 by the filter expression sending means 301 is an expression for selecting resource information whose attribute value exceeds or does not exceed a predetermined threshold value, from many pieces of resource information stored in the resource information storage unit 340. In response to the filter expression 310 from the filter expression sending means 301, the resource providing device 320 uses the resource information filter means 321 to extract only resource information, which satisfies the filter expression 310, from the resource information storage unit 340 and uses the resource information delivery means 322 to deliver the extracted resource information to the resource use device 300 as resource information 330. For example, when the filter expression 310 indicating "a host with the CPU speed of 750 MHz or higher and a free memory capacity of 256 MB or larger" is sent by the filter expression sending means 301, the resource information filter means 321 extracts information on all hosts satisfying the condition from the resource information storage unit 340 and sends the extracted information to the resource use device 300. The resource use device 300 determines a resource to be actually used from the delivered resource information and use that resource. For example, when the resource is a host, a job is submitted to the determined host.

On the other hand, the conventional technologies for information search include the following. One technology (for example, see Patent Document 1) is that, when there are a plurality of databases to be searched, data satisfying a predetermined condition is searched for from a particular database and, only if the number of searched-for data items is smaller than a predetermined number, other databases are searched. Another technology (for example, see Patent Document 2) is that the so-called ranking search is performed in a web search operation on the Internet or in an information search operation for outputting an ordered search result.

[Patent Document 1]
Japanese Patent Kokai Publication No. JP-P2000-235583A
[Patent Document 2]
Japanese Patent Kokai Publication No. JP-P2004-94813A
[Non-Patent Document 1]
K. Czajkowski et al. "Grid Information Services for Distributed Resource Sharing" [online], [searched on Jul. 21, 2004], Internet <http://www.globus.org/research/papers/MDS-HPDC.pdf>[Non-Patent Document 2]
"MDS 2.2 User's Guide", (Chapter 2-Chapter 4), The Globus Project, [online] [searched on Jul. 21, 2004], Internet <http://www.globus.org/mds/mdsusersguide.pdf>

If the resource information storage unit 340 in the conventional resource information collection and delivery system shown in FIG. 24 contains many pieces of resource information satisfying the condition specified by the filter expression 310, all such resource information is delivered to the resource use device 300. Although only one resource providing device 320 is shown in FIG. 24, there are usually many resource providing devices. Because the resource use device 300 collects resource information from each of those resource providing devices 320, the number of collected resource information pieces is further increased. Therefore, when the resource use device 300 has a separately defined evaluation expression for selecting more valuable resources from those resources satisfying the condition, specified by the filter expression 310, to select a resource to be actually used, the problem is that the amount of calculation on the resource use device 300 increases in proportion to the number of delivered resource information pieces. This requires the resource use device 300 to have sufficient calculation power.

A more rigid condition, if specified for the filter expression 310, could control the number of collected resource information pieces. However, the problem is that, because the resource use device 300 side usually has no way to identify the attribute distribution of the resource information stored in the resource information storage unit 340 of the resource providing devices 320, specifying a rigid condition requires many attempts on a trial and error basis with the result that the efficiency of resource information collection is decreased.

When the technology described in Patent Document 1 is used, resource information satisfying the condition of the filter expression 310 is collected first from a particular resource providing device 320 and, only if the number of resource information pieces is smaller than a predetermined number, resource information is collected also from other resource providing devices 320. The problem with this method is that more valuable resource information is sometimes not collected.

A ranking search is used in an Internet web search or a document search, as described in Patent Document 2, to output an ordered search result (with ranking). For example, points (scores) are calculated for the documents based on an evaluation criterion such as the number of keywords included in the documents when a keyword search is performed, or on an evaluation criterion such as the resemblance of a sentence to a specified sentence when a natural sentence search is performed, and the resulting documents are output in order of the points (scores). However, such evaluation criteria, which are set by the information providing side for ranking search, do not guarantee that highly ranked search results are always valuable to the user side. In addition, because each information providing device side ranks the result based on its own evaluation criterion, comparison among the ranks produced by a plurality of information providing devices is meaningless. Therefore, the problem with this method is that relative merits among search results cannot be determined.

SUMMARY OF THE DISCLOSURE

In view of the foregoing, it is a first object of the present invention to reduce the amount of processing required for selecting resources for use by a resource use device when resource information is collected or delivered for grid computing.

It is a second object of the present invention to prevent the processing amount from being significantly increased but to maintain scalabilty even when a resource use device collects resource information from a number of resource providing devices.

It is a third object of the present invention to allow the resource providing device side to deliver resource information, with priority on resource information that is valuable for the resource use device side, to prevent unproductive traffic between the resource providing device and the resource use device.

According to a first aspect of the present invention, a first resource information collection and delivery system comprises at least one resource providing device that has a resource information storage unit in which resource information on resources related to grid computing is stored; and a resource use device that uses the resource, wherein the resource use device comprises evaluation expression sending means for sending an evaluation expression to the resource providing device, the evaluation expression evaluating a value of resource information, and the resource providing device comprises resource information evaluation means for evaluating a value of the resource information using the evaluation expression; and a resource information value addition means for adding a resource information value, which is the evaluation result produced by the resource information evaluation means, to resource information to be delivered to the resource use device.

In this first resource information collection and delivery system, an evaluation expression for evaluating the value of resource information is sent from a resource use device to a resource providing device and the resource providing device side calculates the value of resource information using the evaluation expression, adds the calculated resource information value to the resource information, and delivers the resource information to the resource use device. Therefore, the resource use device can immediately determine the value of the resource information by referencing the resource information value added to the received resource information. Thus, when resource information related to grid computing is collected and delivered, this system reduces the amount of processing required for the resource use device to select resources. In addition, even when resource information is collected from a number of resource providing devices, this system does not increase the amount of processing in the resource use device, thus ensuring scalability.

A second resource information collection and delivery system is as defined by the first resource information collection and delivery system, wherein the resource providing device further comprises resource information sorting means for sorting the resource information, which will be delivered to the resource use device, based on a sequence relation of the resource information value added to the resource information and the resource use device further comprises delivery stopping means for requesting the resource providing device to stop delivery when enough resource information is collected from the resource providing device.

In this second resource information collection and delivery system, resource information is delivered from a resource providing device to a resource use device sequentially in descending order of the resource information value, i.e., from the higher rank. The delivery is stopped when enough resource information is collected from the resource providing device to avoid wasteful traffic between the resource providing device and the resource use device.

A third resource information collection and delivery system according to the present invention is as defined by the first resource information collection and delivery system wherein the resource use device further comprises a resource information value storage unit storing therein sets each composed of a resource information value added to delivered resource information and information on a resource providing device from which the resource information is provided; and providing device selection means for selecting a resource providing device, from which resource information is collected, by referencing the resource information value storage unit.

In this third resource information collection and delivery system, a resource use device can collect resource information from a resource providing device with priority given to a device that provides resource information with a higher resource information value and, in addition, stop the delivery when valuable resource information is sufficiently collected. Therefore, the system can avoid wasteful traffic between the resource providing device and the resource use device.

A fourth resource information collection and delivery system according to the present invention is as defined by the first resource information collection and delivery system wherein the resource providing device further comprises a resource information value holding unit in which a resource information value, which is the evaluation result produced by evaluating the resource information using the evaluation expression, is held; and resource information change detection means for nullifying the resource information value of the resource information held in the resource information value holding unit when an attribute of the resource information is changed, and wherein, for the resource information whose resource information value is held in the resource information value holding unit, the resource information evaluation means omits evaluation using the evaluation expression but uses the resource information value, which is held, as an evaluation result.

In this fourth resource information collection and delivery system, a resource information value is required to be recalculated only when a resource information value is changed from the one delivered previously. Thus, the system can reduce the calculation amount of a resource information value on the resource providing device side.

A fifth resource information collection and delivery system according to the present invention is as defined by the first resource information collection and delivery system wherein the resource providing device further comprises resource information grouping means for classifying resource information stored in the resource information storage unit so that resource information having the same value of an attribute, included in the evaluation expression, belongs to the same group and, when resource information is evaluated using the evaluation expression, the resource information evaluation means checks if there is a resource information value, already calculated using the evaluation expression, for resource information belonging to the same group to which the resource information belongs and, if there is such a value, uses the already-calculated resource information value as the evaluation result.

In this fifth resource information collection and delivery system, resource information having the same resource information value is grouped to reduce the calculation amount of evaluation calculation of resource information in the resource providing device.

A sixth resource information collection and delivery system according to the present invention comprises at least one resource providing device that has a resource information storage unit in which resource information on resources related to grid computing is stored; a resource use device that uses the resource; and a resource mediation device provided between the resource providing device and the resource use device, wherein the resource use device comprises evaluation expression sending means for sending an evaluation expression to the resource mediation device, the evaluation expression evaluating a value of resource information, and the resource mediation device comprises resource information collection means for collecting the resource information from the resource providing device; resource information evaluation means for evaluating a value of the resource information, collected by the resource information collection means, using the evaluation expression; and a resource information value addition means for adding a resource information value, which is the evaluation result produced by the resource information evaluation means, to resource information to be delivered to the resource use device.

In this sixth resource information collection and delivery system, a resource mediation device can calculate a resource information value on behalf of a resource providing device that has no function to evaluate resource information. When collecting and delivering resource information used in grid computing, this system reduces the amount of processing in a resource use device for selecting a resource. In addition, even when resource information is collected from a number of resource providing devices, this system does not increase the amount of processing in a resource use device, thus ensuring scalability.

According to a second aspect of the present invention, there is provided a method for collecting and delivering resource information.

A first resource information collection and delivery method according to the present invention comprises the steps of (a) sending, by a resource use device that uses a resource related to grid computing, an evaluation expression to a resource providing device having a resource information storage unit in which resource information on the resource is stored, the evaluation expression evaluating a value of resource information; (b) evaluating, by the resource providing device, the value of resource information using the evaluation expression; and (c) adding, by the resource providing device, a resource information value, which is the evaluation result, to the resource information and delivering the resource information to the resource use device.

In this first resource information collection and delivery method, an evaluation expression for evaluating the value of resource information is sent from a resource use device to a resource providing device and the resource providing device side calculates the value of resource information using the evaluation expression, adds the calculated resource information value to the resource information, and delivers the resource information to the resource use device. Therefore, the resource use device can immediately determine the value of the resource information by referencing the resource information value added to the received resource information.

Thus, when resource information related to grid computing is collected and delivered, this method reduces the amount of processing required for the resource use device to select resources. In addition, even when resource information is collected from a number of resource providing devices, this method does not increase the amount of processing in the resource use device, thus ensuring scalability.

A second resource information collection and delivery method according to the present invention comprises the steps of (a) sending, by a resource use device that uses a resource related to grid computing, an evaluation expression to a resource providing device having a resource information storage unit in which resource information on the resource is stored, the evaluation expression evaluating a value of resource information; (b) evaluating, by the resource providing device, the value of resource information using the evaluation expression; (c) adding, by the resource providing device, a resource information value, which is the evaluation result, to the resource information; (d) sorting, by the resource providing device, the resource information based on a sequence relation of the resource information value added to the resource information and delivering the sorted resource information to the resource use device; and (e) requesting, by the resource use device, the resource providing device to stop the delivery when enough resource information is collected from the resource providing device.

In this second resource information collection and delivery method, resource information is delivered from a resource providing device to a resource use device sequentially in descending order of the resource information value. The delivery is stopped when enough resource information is collected from the resource providing device to avoid wasteful traffic between the resource providing device and the resource use device.

A third resource information collection and delivery method according to the present invention comprises the steps of (a) referencing, by a resource use device that uses a resource related to grid computing, a resource information value storage unit to select a resource providing device from which resource information is to be collected, the resource information value storage unit storing therein sets each composed of a resource information value added to resource information delivered in the past and information on a resource providing device from which the resource information was provided; (b) sending, by the resource use device, an evaluation expression to the selected resource providing device, the evaluation expression evaluating a value of resource information; (c) evaluating, by the resource providing device, the value of resource information using the evaluation expression; (d) adding, by the resource providing device, a resource information value, which is the evaluation result, to the resource information and delivering the resource information to the resource use device; and (e) storing, by the resource use device, a set in the resource information value storage unit, the set being composed of the resource information value added to the resource information delivered from the resource providing device and information on the resource providing device.

In this third resource information collection and delivery method, a resource use device can collect resource information from a resource providing device with priority given to a device that provides resource information with a higher resource information value and, in addition, stop the delivery when valuable resource information is sufficiently collected. Therefore, the method can avoid wasteful traffic between the resource providing device and the resource use device.

A fourth resource information collection and delivery method according to the present invention comprises the steps of (a) sending, by a resource use device that uses a resource related to grid computing, an evaluation expression to a resource providing device having a resource information storage unit in which resource information on the resource is stored, the evaluation expression evaluating a value of resource information; (b) referencing, by the resource providing device, a resource information value holding unit to check if past evaluation results can be used, the resource information value holding unit storing therein resource information values that are a result produced by evaluating the resource information using the evaluation expression; (c) if it is determined that the past evaluation results cannot be used, evaluating, by the resource providing device, the resource information using the evaluation expression and saving a result in the resource information value holding unit; (d) adding, by the resource providing device, a resource information value, which is the result of evaluation, to the resource information and delivering the resource information to the resource use device; and (e) nullifying, by the resource providing device, the resource information value of the resource information held in the resource information value holding unit when an attribute of the resource information is changed.

In this fourth resource information collection and delivery method, a resource information value is required to be recalculated only when a resource information value is changed from the one delivered previously. Thus, the method can reduce the calculation processing amount of a resource information value on the resource providing device side.

A fifth resource information collection and delivery method according to the present invention comprises the steps of (a) sending, by a resource use device that uses a resource related to grid computing, an evaluation expression to a resource providing device having a resource information storage unit in which resource information on the resource is stored, the evaluation expression evaluating a value of resource information; (b) classifying, by the resource providing device, resource information stored in the resource information storage unit into groups each composed of resource information having the same value for an attribute included in the evaluation expression; (c) evaluating, by the resource providing device, a value of one piece of resource information belonging to the group using the evaluation expression and, for other pieces of resource information belonging to the same group, using the evaluation result; and (d) adding, by the resource providing device, a resource information value, which is the evaluation result, to the resource information and delivering the resource information to the resource use device.

In this fifth resource information collection and delivery method, resource information having the same resource information value is grouped to reduce the calculation amount of evaluation calculation of resource information in the resource providing device.

A sixth resource information collection and delivery method according to the present invention comprises the steps of (a) sending, by a resource use device that uses a resource related to grid computing, an evaluation expression to a resource mediation device, the evaluation expression evaluating a value of resource information; (b) collecting, by the resource mediation device, resource information from a resource providing device having a resource information storage unit in which resource information on the resource is stored; (c) evaluating, by the resource mediation device, the value of the collected resource information using the evaluation expression; and (d) adding, by the resource mediation device, a resource information value, which is the evaluation result, to the resource information and delivering the resource information to the resource use device.

In this sixth resource information collection and delivery method, a resource mediation device can calculate a resource information value on behalf of a resource providing device that has no function to evaluate resource information. When collecting and delivering resource information used in grid computing, this method reduces the amount of processing in a resource use device for selecting a resource. In addition, even when resource information is collected from a number of resource providing devices, this method does not increase the amount of processing in a resource use device, thus ensuring scalability.

According to a third aspect of the present invention, there is provided a resource providing device.

A first resource providing device according to the present invention that has a resource information storage unit, in which resource information on resources related to grid computing is stored, comprises resource information evaluation means for receiving an evaluation expression from a resource use device that uses the resources and evaluating a value of the resource information using the evaluation expression, the evaluation expression evaluating a value of the resource information; and resource information value addition means for adding a resource information value, which is the evaluation result produced by the resource information evaluation means, to resource information to be delivered to the resource use device.

In this first resource providing device, when a resource use device sends an evaluation expression for evaluating the value of resource information to a resource providing device, the resource providing device side calculates the value of resource information using the evaluation expression and delivers the resource information, to which the calculated resource information value is added, to the resource use device. Therefore, the resource use device can immediately determine the value of the resource information by referencing the resource information value added to the received resource information. Thus, when resource information related to grid computing is collected and delivered, this device reduces the amount of processing required for the resource use device to select resources. In addition, even when resource information is collected from a number of resource providing devices, this device does not increase the amount of processing in the resource use device, thus ensuring scalability.

A second resource providing device according to the present invention is as defined by the first resource providing device, further comprising resource information sorting means for sorting the resource information, which will be delivered to the resource use device, based on a sequence relation of the resource information value added to the resource information.

In this second resource providing device, resource information is delivered from a resource providing device to a resource use device sequentially in descending order of the resource information value. Therefore, the resource use device can stop the delivery when enough resource information is collected from the resource providing device to avoid wasteful traffic between the resource providing device and the resource use device.

A third resource providing device according to the present invention is as defined by the first resource providing device, further comprising a resource information value holding unit in which a resource information value, which is the evaluation result produced by evaluating the resource information using the evaluation expression, is held; and resource information change detection means for nullifying the resource information value of the resource information held in the resource information value holding unit when an attribute of the resource information is changed, wherein, for the resource information whose resource information value is held in the resource information value holding unit, the resource information evaluation means omits evaluation using the evaluation expression but uses the resource information value, which is held, as an evaluation result.

In this third resource providing device, a resource information value is required to be recalculated only when a resource information value is changed from the one delivered previously. Thus, the calculation amount of a resource information value on the resource providing device side can be reduced.

A fourth resource providing device according to the present invention is as defined by the first resource providing device, further comprising resource information grouping means for classifying resource information stored in the resource information storage unit so that resource information having the same value of an attribute, included in the evaluation expression, belongs to the same group, wherein, when resource information is evaluated using the evaluation expression, the resource information evaluation means checks if there is a resource information value, already calculated using the evaluation expression, for resource information belonging to the same group to which the resource information belongs and, if there is such a value, uses the already-calculated resource information value as the evaluation result.

In this fourth resource providing device, resource information having the same resource information value is grouped to reduce the calculation amount of evaluation calculation of resource information in the resource providing device.

According to a fourth aspect of the present invention, there is provided a resource mediation device.

A resource mediation device according to the present invention, provided between at least one resource providing device having a resource information storage unit in which resource information on resources related to grid computing is stored and a resource use device that uses the resources, comprises resource information collection means for collecting the resource information from the resource providing device; resource information evaluation means for receiving an evaluation expression from the resource use device and evaluating a value of the collected resource information using the evaluation expression, the evaluation expression evaluating a value of resource information; and resource information value addition means for adding a resource information value, which is the evaluation result produced by the resource information evaluation means, to resource information to be delivered to the resource use device.

This resource mediation device can calculate a resource information value on behalf of a resource providing device that has no function to evaluate resource information. When collecting and delivering resource information used in grid computing, the device reduces the amount of processing in a resource use device for selecting a resource. In addition, even when resource information is collected from a number of resource providing devices, the device does not increase the amount of processing in a resource use device, thus ensuring scalability.

According to a fifth aspect of the present invention, there is provided a resource use device.

A first resource use device according to the present invention comprises evaluation expression sending means for sending an evaluation expression to a resource providing device having a resource information storage unit in which resource information on resources related to grid computing is stored, the evaluation expression evaluating a value of resource information, wherein the resource use device receives resource information, to which a resource information value that is the evaluation result produced using the evaluation expression is added, from the resource providing device.

When this first resource use device sends an evaluation expression for evaluating the value of resource information to a resource providing device, the resource providing device side calculates the value of resource information using the evaluation expression and delivers the resource information, to which the calculated resource information value is added, to the resource use device. Therefore, the resource use device can immediately determine the value of the resource information by referencing the resource information value added to the received resource information. Thus, when resource information related to grid computing is collected and delivered, this device reduces the amount of processing required for the resource use device to select resources. In addition, even when resource information is collected from a number of resource providing devices, this device does not increase the amount of processing in the resource use device, thus ensuring scalability.

A second resource use device according to the present invention is as defined by the first resource use device, further comprising delivery stopping means for receiving resource information delivered from the resource providing device in order of the sequence relation of the resource information value that is the evaluation result produced using the evaluation expression and for requesting the resource providing device to stop delivery when enough resource information is collected.

This second resource use device can collect resource information from a resource providing device, which provides resource information having a higher resource information value, with priority given to that resource providing device. The device can stop collection when enough valuable resource information is collected to avoid wasteful traffic between the resource providing device and the resource use device.

A third resource use device according to the present invention is as defined by the first resource use device, further comprising a resource information value storage unit storing therein sets each composed of a resource information value added to delivered resource information and information on a resource providing device from which the resource information is provided; and providing device selection means for selecting a resource providing device, from which resource information is collected, by referencing the resource information value storage unit.

This third resource use device can collect resource information from a resource providing device, which provides resource information having a higher resource information value, with priority given to that resource providing device. The device can stop collection when enough valuable resource information is collected to avoid wasteful traffic between the resource providing device and the resource use device.

In a still further aspect of the present invention, there is provided a program for causing a computer to function at least one of the devices according to the preceding aspects.

The meritorious effects of the present invention are summarized as follows.

A first effect of the present invention is that, when a resource use device selects a resource to be used, the amount of selection processing of the resource use device is reduced and, thus, the resource use device does not need to have high calculation power.

The reason is that the resource use device passes an evaluation expression for evaluating a resource to the resource providing device for use in evaluating the resource and that the resource providing device adds a resource information value, which is a result produced by evaluating the resource information using the evaluation expression, to the resource information and delivers the resource information.

A second effect of the present invention is that, even when a resource use device collects resource information from a plurality of resource providing devices, the amount of resource selection calculation in the resource use device is not increased and scalability is maintained.

The reason is that the plurality of resource providing devices, which provide resource information, use the same evaluation expression to calculate resource information values and, therefore, the calculation of the resource information value can be standardized and distributed.

A third effect of the present invention is that wasteful traffic between a resource providing device and a resource use device can be avoided.

The reason is that, because the resource providing device can understand a criterion, by which the resource use device evaluates resource information, from the evaluation expression and send resource information with priority given to more valuable resource information, the resource use device can stop the collection when enough resource information is collected.

A fourth effect of the present invention is that there is no need for controlling the flow amount at the resource information collection time by adjusting the tightness of the condition of a filter expression on a trial and error basis.

The reason is that, because a resource information value is attached to the resource information, it is possible to check the value and determine whether to continue receiving the resource information and, thus, there is no need for feeding back information for adjusting the tightness of the filter expression as in the prior art.

A fifth effect of the present invention is that a resource information value can be calculated more effectively.

The reason is that a resource information value holding unit is used to hold a resource information value, which is the result produced by evaluating resource information using an evaluation expression, and a resource information value is recalculated only when the resource information value is changed from the one calculated previously. Another reason is that resource information is classified into groups each composed of resource information having the same value for an attribute included in said evaluation expression, that is, into groups each composed of resource information having the same resource information value.

BRIEF DESCRIPTION OF THE DRAWINGS

FIG. 10 is a diagram showing an example of the contents of a resource information value storage unit in the third embodiment of the present invention.

FIG. 14 is a diagram showing an example of the contents of a resource information value holding unit in the fourth embodiment of the present invention.

FIG. 18 is a diagram showing an example of the contents of a resource configuration information storage unit in the fifth embodiment of the present invention.

PREFERRED EMBODIMENTS OF THE INVENTION

A first embodiment of the present invention will be described in detail with reference to the drawings.

Figure 1:
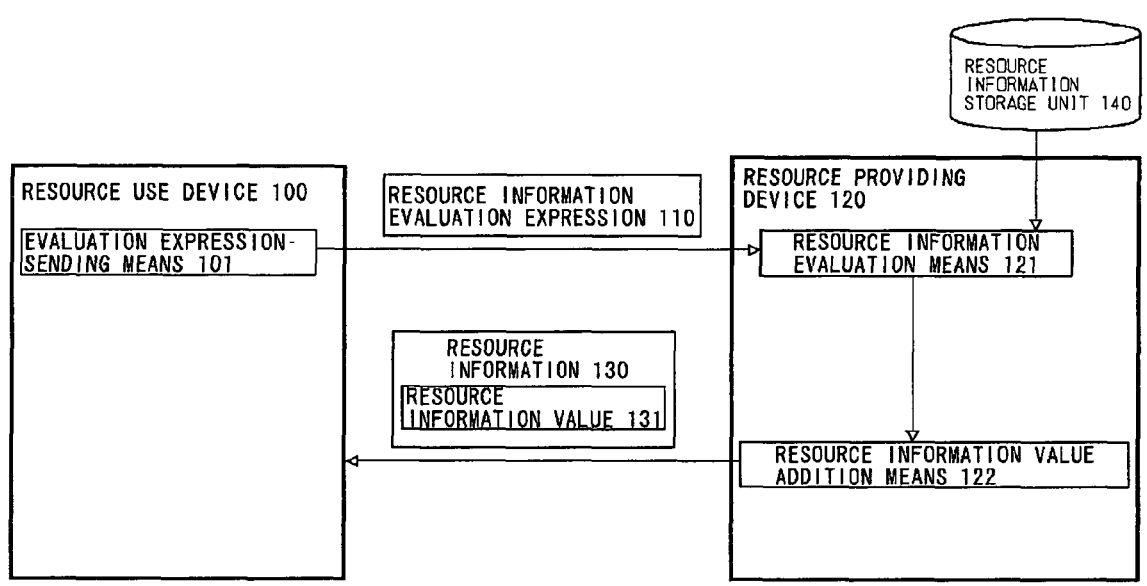
FIG. 1 is a block diagram showing the configuration of a first embodiment of the present invention.

Referring to FIG. 1, a first embodiment of the present invention comprises a resource use device 100 and a resource providing device 120 to which a resource information storage unit 140 is connected. The resource use device 100 and the resource providing device 120 are communicatively connected via a network (not shown) such as the Internet. Although only one resource use device 100 and only one resource providing device 120 are shown in FIG. 1, there are multiple devices for each in most cases.

A set of the resource providing device 120 and the resource information storage unit 140 corresponds to an MDS (Monitoring and Discovery Service) server on which the MDS component of Globus Toolkit is installed. Globus Toolkit, which is described in Non-Patent Document 2, is open source middleware providing the functions necessary to implement grid computing. The MDS server is divided further into two servers: one is a GRIS (Grid Resource Information Service) server on which the GRIS component that handles only local resource information is installed and the other is a GIIS (Grid Index Information Service) server on which a GIIS component is installed that manages resource information reported by a subordinate GRIS server. The set of the resource providing device 120 and the resource information storage unit 140 corresponds to any one of the GRIS server and the GIIS server.

The resource information storage unit 140, which is implemented as a database system, a file system, or a memory system, stores resource information. Resource information is divided roughly into two: static resource information and dynamic resource information. The former includes platform types and architectures, OS names and versions, and network interface information (device names, IP addresses, etc.), and the latter includes CPU information (type, version, speed, cache, usage ratio, No. of CPUs, etc.), memory information (amount of free space, etc.), and file system information (amount of free space, file system names, etc.). Any format can be used for the resource information representation format if resource attributes and their values can be represented. For example, a standard format such as LDIF (LDAP DATA Interchange Format) of LDAP (Lightweight Directory Access Protocol) and CIM (Common Information Model) or a unique format may be used.

Figure 2:
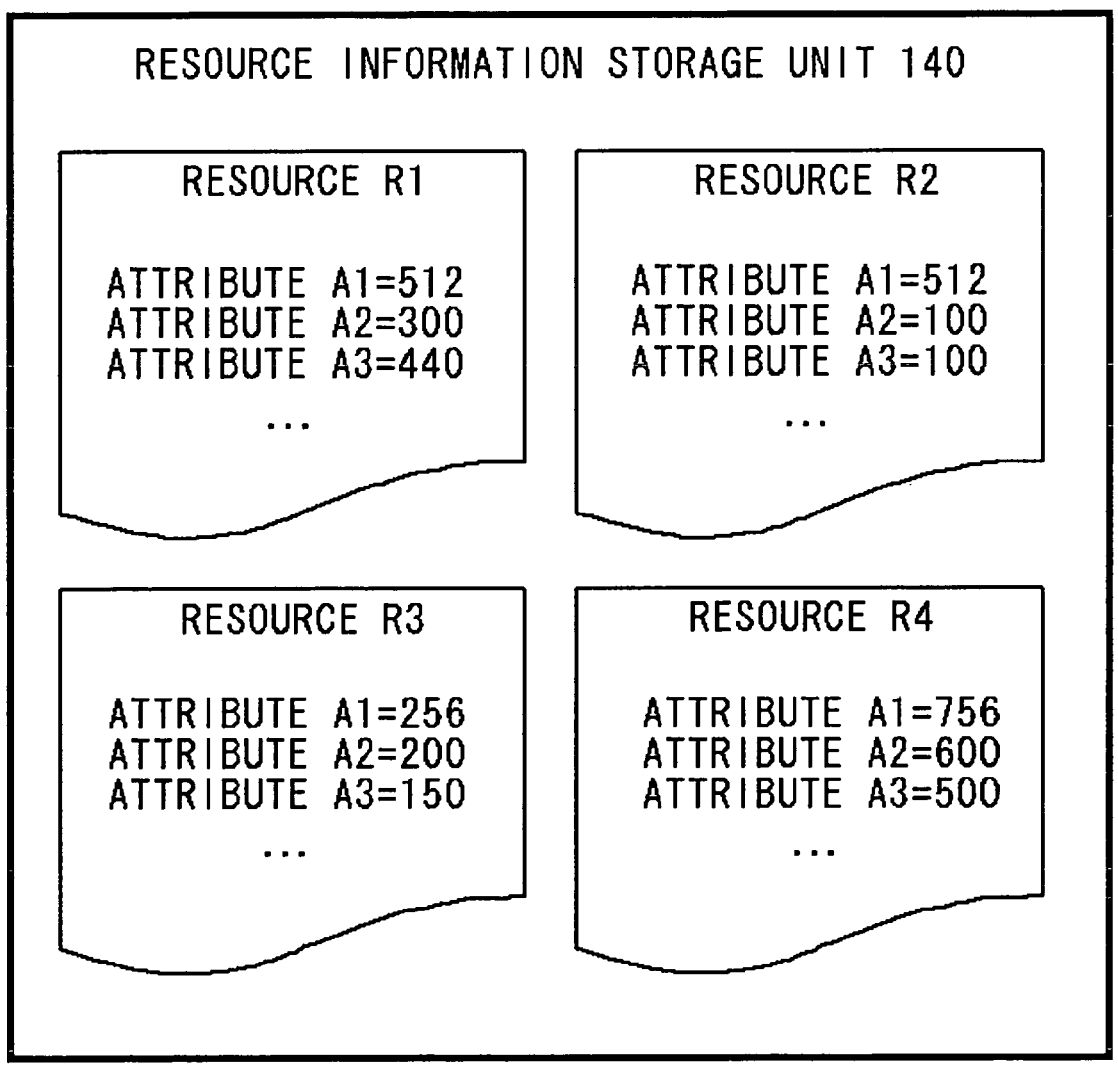
FIG. 2 is a diagram showing an example of the contents of a resource information storage unit in the first embodiment of the present invention.

FIG. 2 shows an example of resource information stored in the resource information storage unit 140. In this example, a format in which a resource attribute and its value are connected by "=" is used as the representation format for resource information. For example, resource R1 has three attributes—attribute A1, attribute A2, and attribute A3—and their values are 512, 300, and 440, respectively.

Referring to FIG. 1 again, the resource use device 100 corresponds to an MDS client in the Globus Toolkit described above.

In this embodiment, the resource use device 100 comprises evaluation expression sending means 101, and the resource providing device 120 comprises resource information evaluation means 121 and resource information value addition means 122.

The evaluation expression sending means 101 is means for sending an evaluation expression 110, which evaluates the value of resource information, from the resource use device 100 to the resource providing device 120 when the resource use device 100 issues an inquiry about resource information to the resource providing device 120. The resource information evaluation expression 110 is used to find a numeric value or a character string representing the sequential relation of resource information such as a value calculated from the attribute values of resource information or a value obtained by operating the resources. For example, this expression is an arithmetic expression for calculating a total by giving weight to each desired attribute of resource information, an arithmetic expression for digitizing the coverage of each desired attribute with an evaluation axis provided, or an expression used for a benchmark for evaluating performance.

The resource information evaluation means 121 is means for calculating the value of resource information, which will be provided from the resource providing device 120 to the resource use device 100, using the resource information evaluation expression 110.

The resource information value addition means 122 is means for adding a resource information value 131, which is calculated by the resource information evaluation means 121 for resource information 130, to the resource information 130 when the resource providing device 120 sends the resource information 130 to the resource use device 100.

Figure 3:
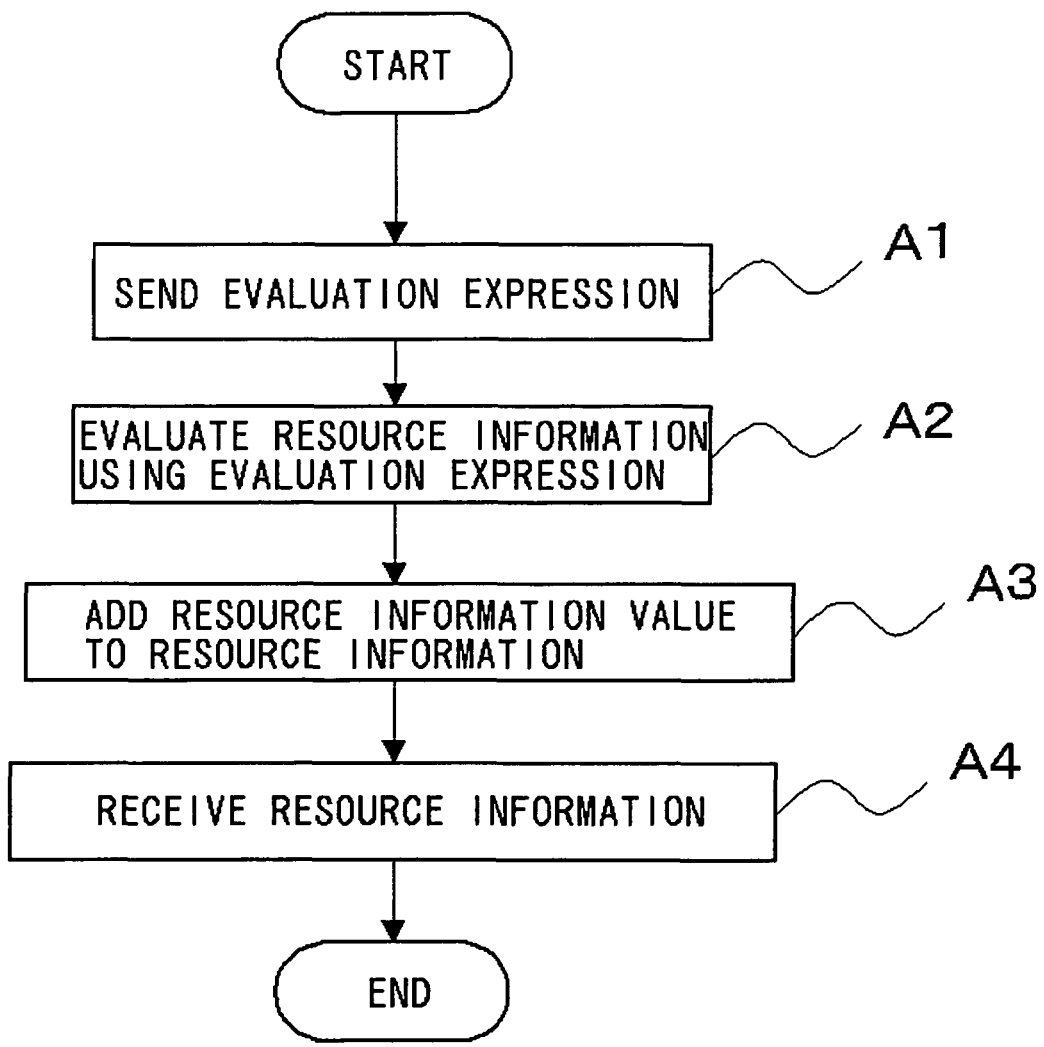
FIG. 3 is a flowchart showing the operation of the first embodiment of the present invention.

Next, the following describes the general operation of this embodiment in detail with reference to the configuration shown in FIG. 1 and the flowchart shown in FIG. 3.

First, the resource use device 100 uses the evaluation expression sending means 101 to send the resource information evaluation expression 110 to the resource providing device 120 (step A1 in FIG. 3).

Figure 4:
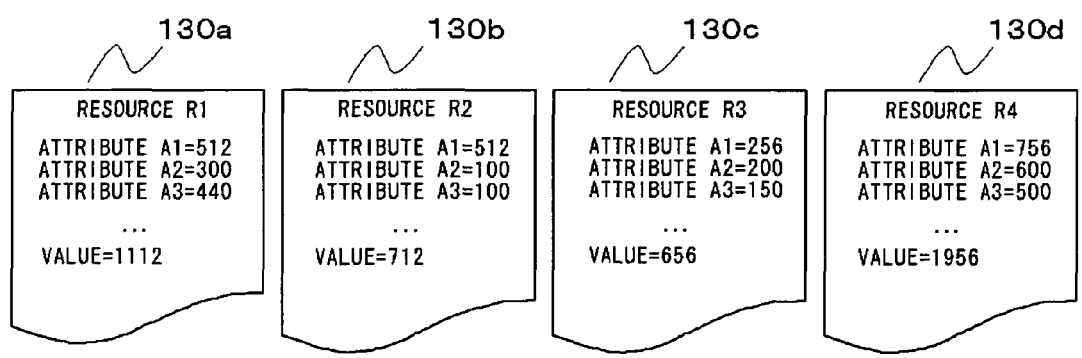
FIG. 4 is a diagram showing an example of resource information, to which a resource information value is added, delivered from a resource providing device to a resource use device in the first embodiment of the present invention.

Next, the resource providing device 120 uses the resource information evaluation means 121 to evaluate the resource information, stored in the resource information storage unit 140, using the resource information evaluation expression 110 (step A2 in FIG. 3). For example, if an arithmetic expression "Attribute A1+2×Attribute A2" for calculating the total of the weighted desired-attributes is given as the evaluation expression 110 and the resource information stored in the resource information storage unit 140 is as shown in FIG. 2, then the resource information values with the values shown in FIG. 4 are calculated for the resources R1-R4, respectively.

Next, the resource providing device 120 uses the resource information value addition means 122 to add the resource information value 131, calculated by the resource information evaluation means 121, to the resource information 130 (step A3 in FIG. 3) and sends the resource information 130 to the resource use device 100, and the resource use device 100 receives the resource information 130 (step A4 in FIG. 3).

Figure 5:
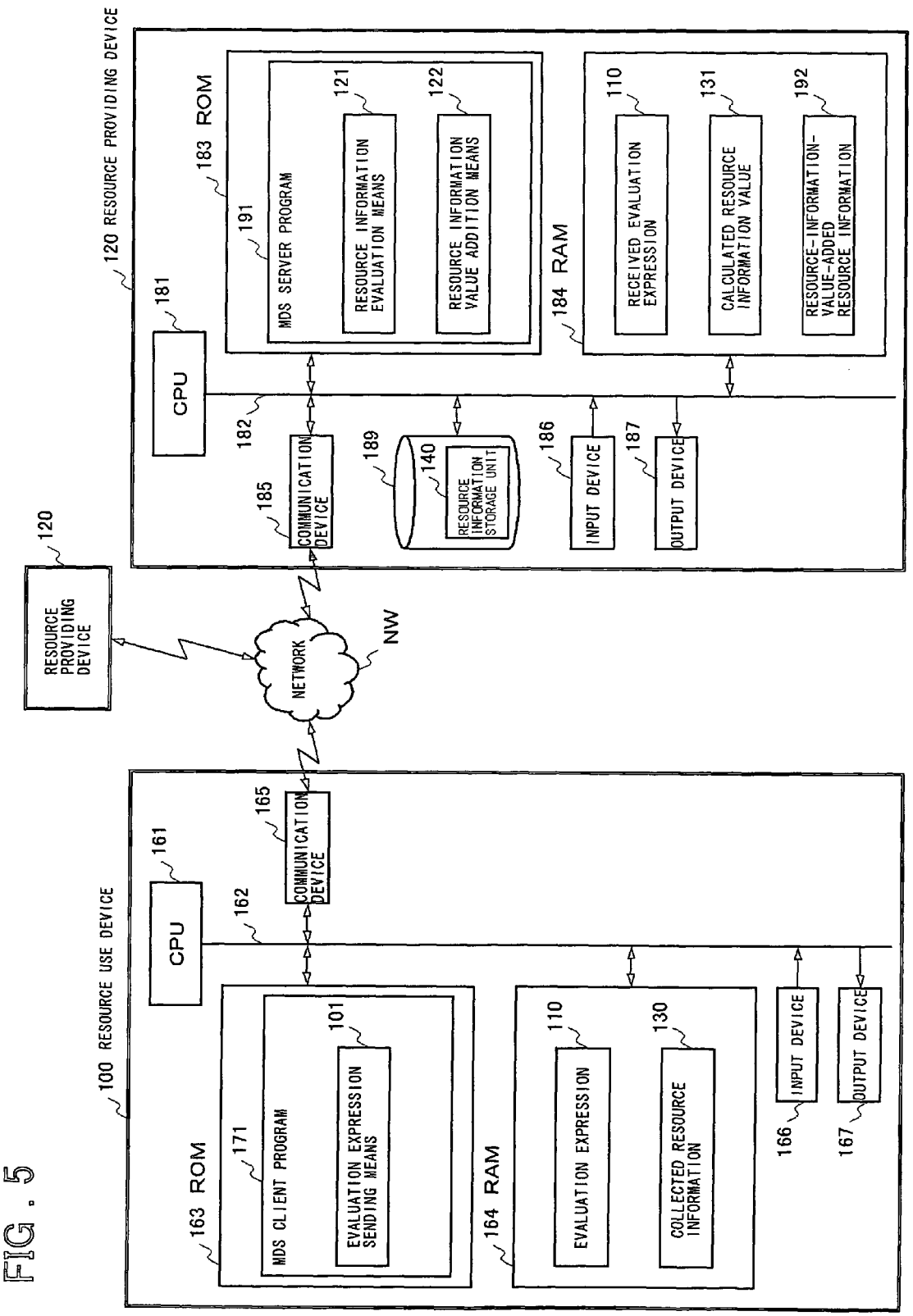
FIG. 5 is a block diagram showing the detailed configuration of a resource use device and a resource providing device in the first embodiment of the present invention.

FIG. 5 shows an example of the detailed configuration of the resource use device 100 and the resource providing device 120.

Referring to FIG. 5, the resource use device 100 comprises a CPU 161 and the devices (program memory such as a ROM 163 and a RAM 164, a communication device 165, an input device 166, and an output device 167) connected to the CPU 161 via a bus 162. More specifically the resource use device 100 comprises an information processing device such as a personal computer and a portable information terminal. The ROM 163 stores an MDS client program 171 that includes the evaluation expression sending means 101 as one of its functions. The RAM 164 stores the resource information evaluation expression 110 to be sent to the resource providing device 120 and the resource information 130 received from the resource providing device 120. The resource information evaluation expression 110 is input by the user from the input device 166 such as a keyboard, and the evaluation expression sending means 101 reads the resource information evaluation expression 110 from the RAM 164 and sends it to the resource providing device 120. The output device 167 is a device such as a display or a printer, and the communication device 165 is a LAN card. The communication device 165 communicates with the resource providing device 120 via a network NW such as the Internet.

The resource providing device 120 comprises a CPU 181 and the devices (program memory such as a ROM 183 and a RAM 184, a communication device 185, an input device 186, an output device 187, and a hard disk 189) connected to the CPU 181 via a bus 182. More specifically, the resource providing device 120 comprises an information processing device such as a personal computer or a workstation. The hard disk 189, used as the resource information storage unit 140, records therein resource information on the resources. The ROM 183 stores an MDS server program 191 that includes the resource information evaluation means 121 and the resource information value addition means 122 as one of its functions. The RAM 184 stores the resource information evaluation expression 110 received from the resource use device 100, the resource information value 131 on the resources calculated by the resource information evaluation means 121, and resource-information-value-added resource information 192. The resource information evaluation means 121 reads the resource information evaluation expression 110, received from the resource use device 100, from the RAM 184, reads information on the resources from the hard disk 189, calculates the value 131 of the resource information using the resource information evaluation expression 110, and saves the calculation result in the RAM 184 for each resource. Each piece of resource information has an identifier for identifying itself, and the same identifier is attached also to the resource information value 131 to identify to which resource information the value belongs. The resource information value addition means 122 reads the value 131 of the resource information from the RAM 184, adds the value to the corresponding resource information 130 read from the hard disk 189, generates the resource-information-value-added resource information 192 on the RAM 184, reads it, and sends it to the resource use device 100. The input device 186 is a device such as a keyboard, and the output device 167 is a device such as a display or a printer. For example, those devices are used as maintenance input/output devices of the resource providing device 120. The communication device 185 is a LAN card used for communication with the resource use device 100 via the network NW such as the Internet.

Next, the following describes the effect of this embodiment. In this embodiment, the resource information evaluation expression 110 is sent to the resource providing device 120. The resource providing device 120 evaluates the expression, adds the resource information value 131, which is the result of the evaluation, to the resource information 130, and delivers the resource information 130 to the resource use device 100. Therefore, the resource use device 100 does not need to perform resource evaluation information calculation for selecting the resources. This configuration not only eliminates the need for the resource use device 100 to have a large calculation ability but also increases scalability when resources are collected from a wide range in which a plurality of resource providing devices are included.

Next, a second embodiment of the present invention will be described in detail with reference to the drawings.

Figure 6:
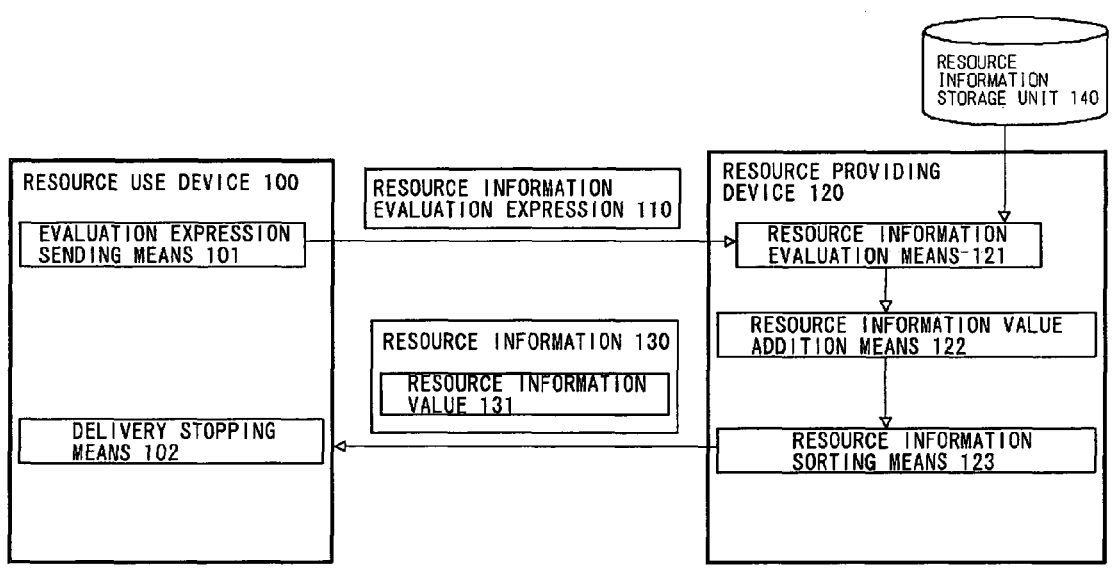
FIG. 6 is a block diagram showing the configuration of a second embodiment of the present invention.

Referring to FIG. 6, the second embodiment of the present invention differs from the first embodiment in that a resource providing device 120 further comprises resource information sorting means 123 and a resource use device 100 further comprises delivery stopping means 102.

The resource information sorting means 123 is means for re-sequencing pieces of resource information 130 based on the sequence relation of resource information values 131 added to the resource information 130.

The delivery stopping means 102 is means for causing the resource providing device 120 to stop the delivery of the resource information 130 based on the status of the received resource information values 131.

Figure 7:
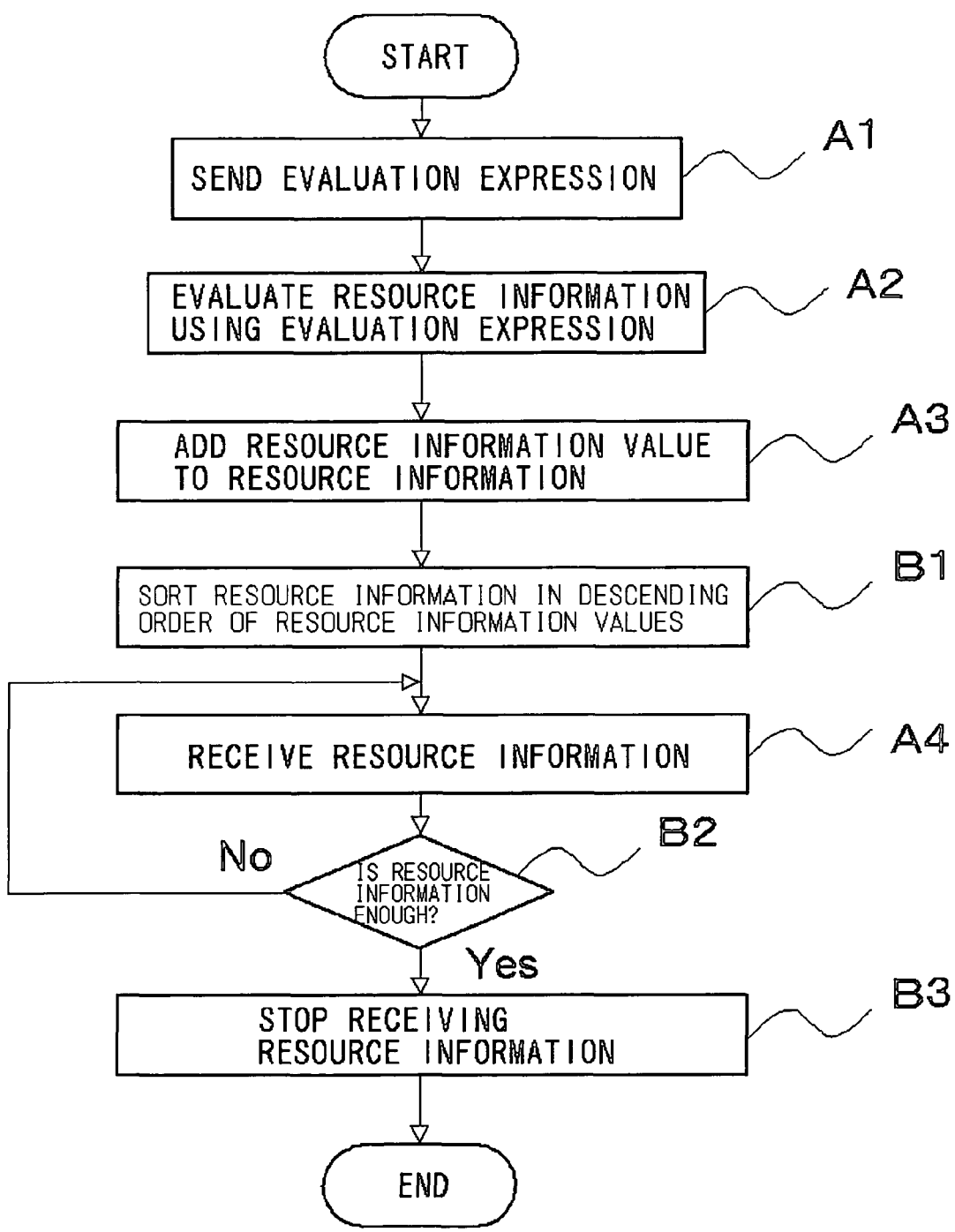
FIG. 7 is a flowchart showing the operation of the second embodiment of the present invention.

Next, the following describes the general operation of this embodiment with reference to the configuration shown in FIG. 6 and the flowchart shown in FIG. 7.

First, the resource use device 100 uses an evaluation expression sending means 101 to send a resource information evaluation expression 110 to the resource providing device 120 (step A1 in FIG. 7). Next, the resource providing device 120 uses a resource information evaluation means 121 to evaluate the resource information, stored in a resource information storage unit 140, using the resource information evaluation expression 110 (step A2 in FIG. 7) and, then, uses a resource information value addition means 122 to add the resource information value 131, calculated by the resource information evaluation means 121, to resource information 130 (step A3 in FIG. 7). Up to this step, the operation is the same as that in the first embodiment. For example, if "Attribute A1+2×Attribute 2" is given as the expression 110 and the resource information stored in the resource information storage unit 140 is as shown in FIG. 2, the resource information values with the values, shown in FIG. 4, are calculated for resources R1 to R4, respectively.

Next, the resource providing device 120 uses the resource information sorting means 123 to sort the (pieces of) resource information 130 in descending order of the resource information values 131 added to the resource information 130 (step B1 in FIG. 7) and sequentially delivers the resource information 130, to which the resource information value 131 is added, in descending order of values until the resource use device 100 issues a delivery stop request or until all resource information is delivered (step A4 in FIG. 7). For example, when the values of resources R1-R4 are calculated as shown in FIG. 4, the resource providing device 120 sorts resource information 130a-130d in descending order of the resource information value 131 and delivers the resource information in the order of 130d, 130a, 130b, and 130c.

Each time the resource use device 100 receives the resource information 130 from the resource providing device 120, the resource use device 100 uses the delivery stopping means 102 to check if the resource information enough to select resources is collected (step B2 in FIG. 7). If the resource information is enough, the resource use device 100 sends a delivery stop request to the resource providing device 120 to stop the delivery of the resource information 130 (step B3 in FIG. 7). More specifically, the resource use device 100 checks if enough resource information for selecting resources is collected by detecting if a predetermined number (N) of resource information pieces with a high resource information value have been received or by detecting if resource information with a resource information value equal to or higher than a fixed value (V) has been received before the predetermined time T is elapsed. It is also possible to configure the delivery stopping means 102 so that a delivery stop request is sent if the predetermined time S is elapsed.

Figure 8:
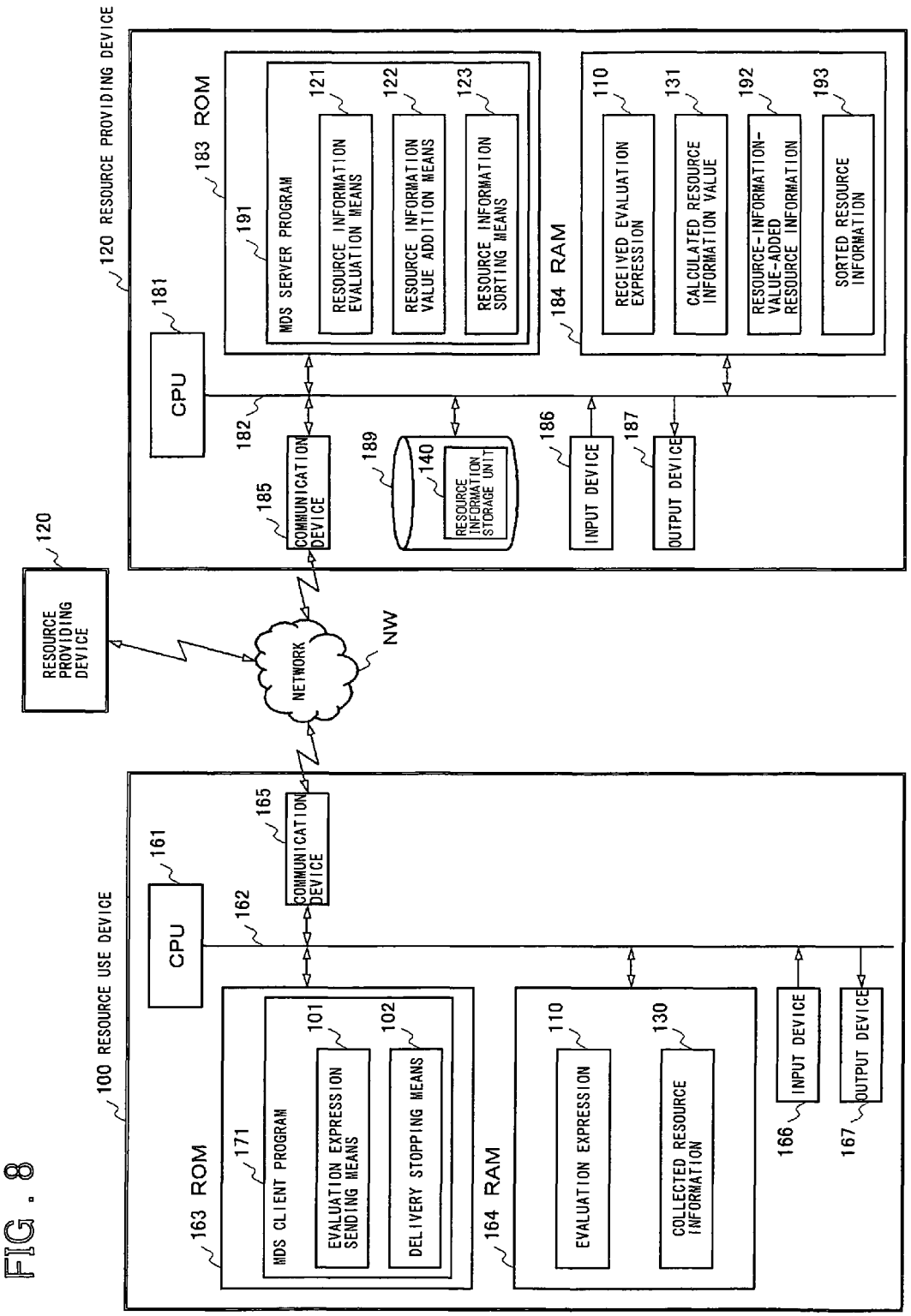
FIG. 8 is a block diagram showing the detailed configuration of a resource use device and a resource providing device in the second embodiment of the present invention.

FIG. 8 shows an example of the detailed configuration of the resource use device 100 and the resource providing device 120 in this embodiment. As compared with the example of configuration shown in FIG. 5, a new component, the delivery stopping means 102, is included in the MDS client program 171 stored in the ROM 163 of the resource use device 100 and another new component, the resource information sorting means 123, is included in the MDS server program 191 stored in the ROM 183 of the resource providing device 120. The delivery stopping means 102 references the (collected) resource information 130, received from the resource providing device 120 and stored in the RAM 164, to determine whether to stop the delivery. To stop the delivery, the delivery stopping means 102 sends a delivery stop request to the resource providing device 120, which is collecting resource information, via the communication device 165. The resource information sorting means 123 sorts the resource-information-value-added resource information 192, which is generated on the RAM 184 by the resource information value addition means 122 and to which resource information values are added, into the descending order, with the resource information value as the key, for generating the sorted resource information 193 on the RAM 184. The resource providing device 120 reads the sorted resource information 193 sequentially from the beginning and delivers it to the resource use device 100, one or multiple pieces at a time.

Next, the following describes the effect of this embodiment. In this embodiment, the resource information is sorted based on the sequence relation of resource information values before being delivered, and the delivery can be stopped when any given number of resource information pieces are received. Therefore, because the resource use device 100 can stop the collection before receiving low-value resource information, the network traffic can be reduced. In addition, the resource information values are already calculated and the resource information is delivered sequentially in the descending order of the value, the higher-value resource information can be obtained from the set of resource information regardless of how the resource information values are distributed without adjusting the resource information evaluation expression.

Next, a third embodiment of the present invention will be described in detail with reference to the drawings.

Figure 9:
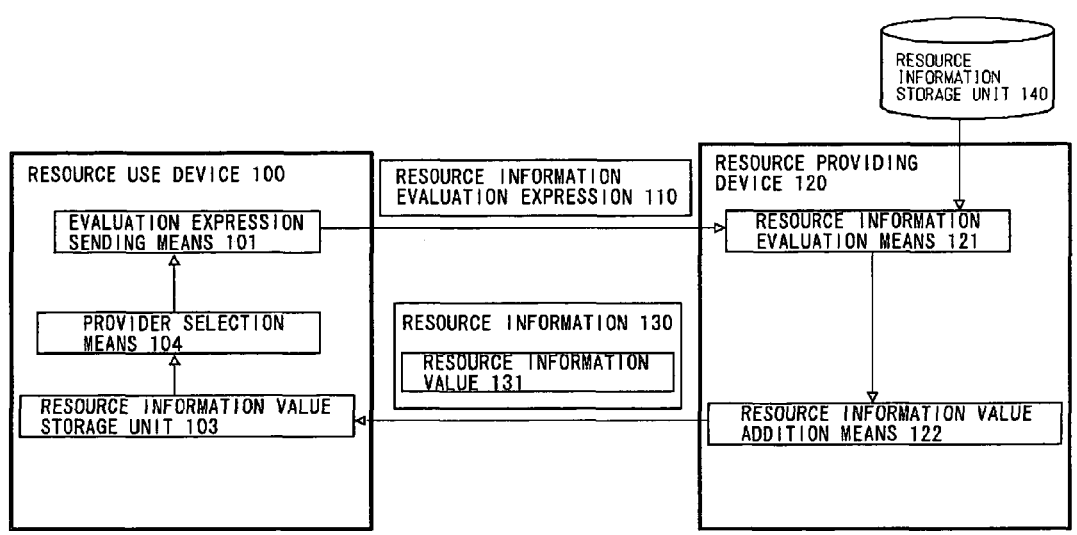
FIG. 9 is a block diagram showing the configuration of a third embodiment of the present invention.

Referring to FIG. 9, the third embodiment of the present invention differs from the first embodiment in that a resource use device 100 further comprises a resource information value storage unit 103 and provider (providing device) selection means 104.

The resource information value storage unit 103 stores the history of resource information values 131, delivered from resource providing devices 120, for each resource providing device 120. For example, as shown in FIG. 10, the resource information value storage unit 103 holds a list of data identifying a resource providing device 120 (such as the identifier or the communication address of resource providing device 120) and resource information value data received from that resource providing device 120 up to the present. The resource information value data that is held is, for example, all received data, all data received during a predetermined past time, or the several highest value data pieces received during a predetermined past time.

The providing device selection means 104 is provided for use when resource information is re-collected from the resource providing devices 120. The providing device selection means 104 is means for determining which resource providing device should be given priority as a device from which resource information is collected, based on the history of the resource information values stored in the resource information value storage unit 103. More specifically, resource information is collected with priority given to a resource providing device that has provided resource information with a higher resource information value.

Figure 11:
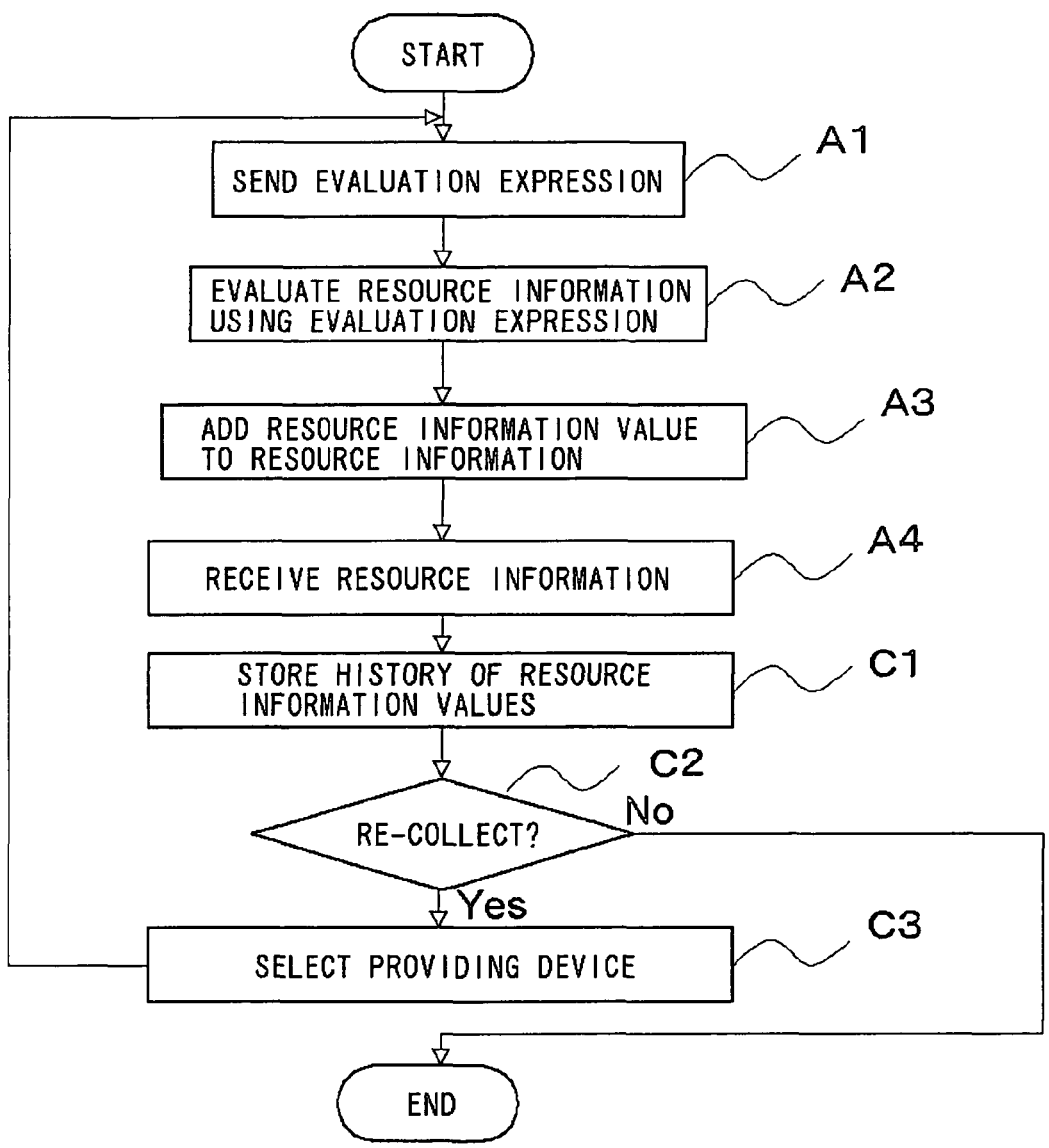
FIG. 11 is a flowchart showing the operation of the third embodiment of the present invention.

Next, the following describes the general operation of this embodiment in detail with reference to the configuration shown in FIG. 9 and the flowchart shown in FIG. 11.

First, the resource use device 100 uses evaluation expression sending means 101 to send a resource information evaluation expression 110 to the resource providing device 120 (step A1 in FIG. 11). Next, the resource providing device 120 uses resource information evaluation means 121 to evaluate the resource information, stored in a resource information storage unit 140, using the resource information evaluation expression 110 (step A2 in FIG. 11). Next, the resource providing device 120 uses a resource information value addition means 122 to add a resource information value 131, calculated by the resource information evaluation means 121, to resource information 130 (step A3 in FIG. 11) and then sends the resource information 130 to the resource use device 100 (step A4 in FIG. 11). The operation up to this step is the same as that in the first embodiment. For example, when an expression "Attribute A1+2×Attribute A2" is given as the evaluation expression 110 and the resource information stored in the resource information storage unit 140 is as shown in FIG. 2, the resource-information-value-added resource information 130a-130d shown in FIG. 4 is delivered from the resource providing device 120 to the resource use device 100.

In this embodiment, after receiving the resource information 130, the resource use device 100 stores a set of the resource information value 131 and the resource providing device 120 that provides the value in the resource information value storage unit 103 (step C1 in FIG. 11). When the resource use device 100 collects resource information again (step C2 in FIG. 11), it uses the providing device selection means 104 to reference a list of resource information value 131 of each resource information providing device stored in the resource information value storage unit 103, selects a resource providing device 120 that has provided higher-value resource information (step C3 in FIG. 11), and returns control to step A1 to repeat the processing described above. For example, if the data such as the one shown in FIG. 10 is stored in the resource information value storage unit 103, the resource use device 100 collects resource information with priority given to a resource providing device 120b that provides resource information with a higher resource information value.

Figure 12:
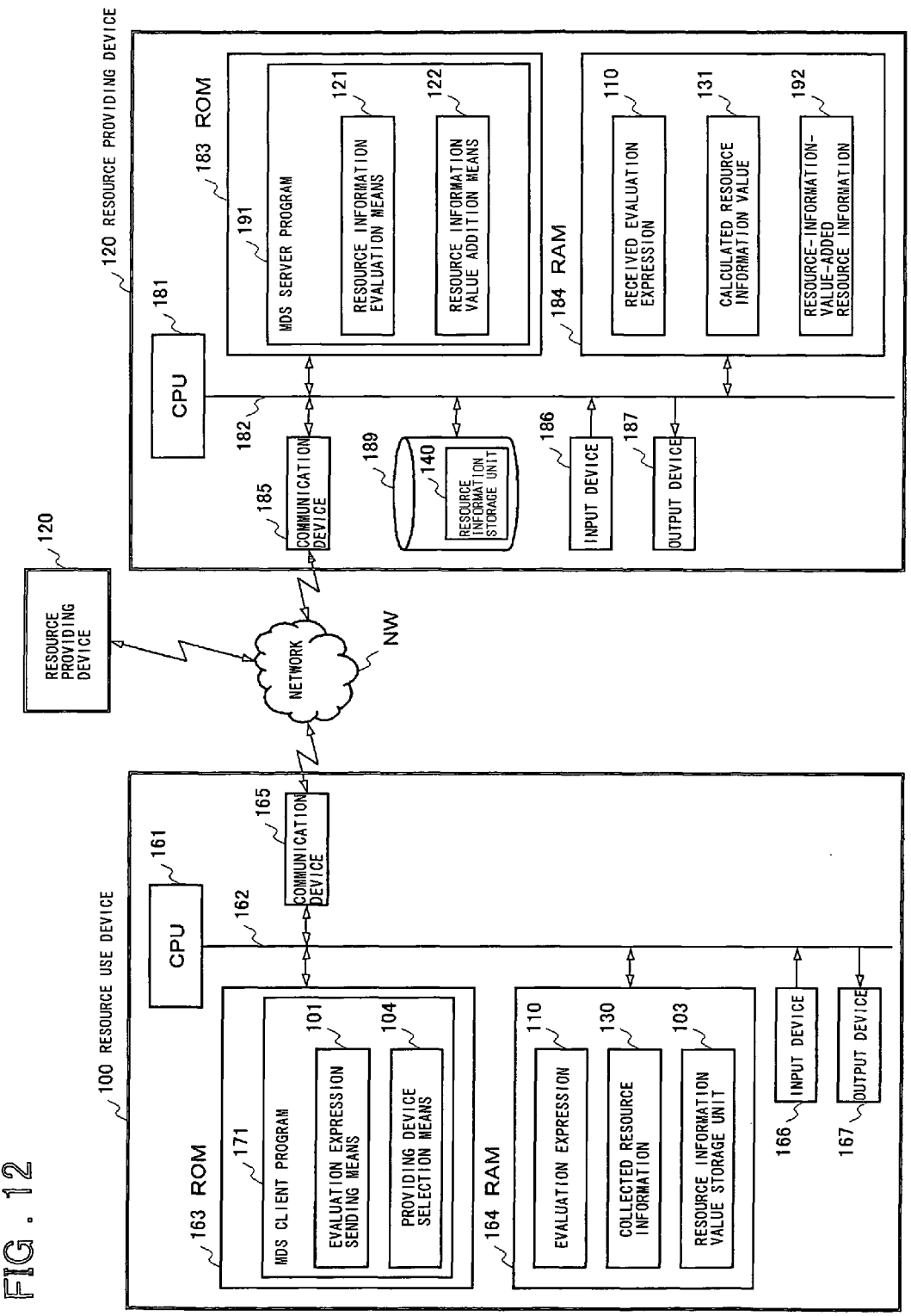
FIG. 12 is a block diagram showing the detailed configuration of a resource use device and a resource providing device in the third embodiment of the present invention.

FIG. 12 shows an example of the detailed configuration of the resource use device 100 and the resource providing device 120 in this embodiment. As compared with the example of the configuration shown in FIG. 5, the providing device (provider) selection means 104 is newly included in an MDS client program 171 stored in a ROM 163 of the resource use device 100, and the resource information value storage unit 103 is provided in a RAM 164. When resource information to which a resource information value is added is delivered from the resource providing device 120 to which the evaluation expression 110 stored in the RAM 164 was sent, the evaluation expression sending means 101 saves the resource information in the RAM 164. At the same time, the evaluation expression sending means 101 associates a set, composed of data identifying the resource providing device 120 and the resource information value added to the resource information received from the resource providing device 120 as described above, with the evaluation expression 110 and stores the set in the resource information value storage unit 103. The next time resource information is collected using the same evaluation expression 110, the resource use device 100 uses the providing device selection means 104 to reference the contents of the resource information value storage unit 103 associated with the evaluation expression 110 and determines a resource providing device to which priority is given for collecting resource information.

In this embodiment, when the resource use device side repeatedly collects resource information using the same evaluation expression, it performs a search as described above with priority given to a resource providing device that provides resource information with a higher resource information value and therefore reduces traffic.

Next, a fourth embodiment of the present invention will be described in detail with reference to the drawings.

Figure 13:
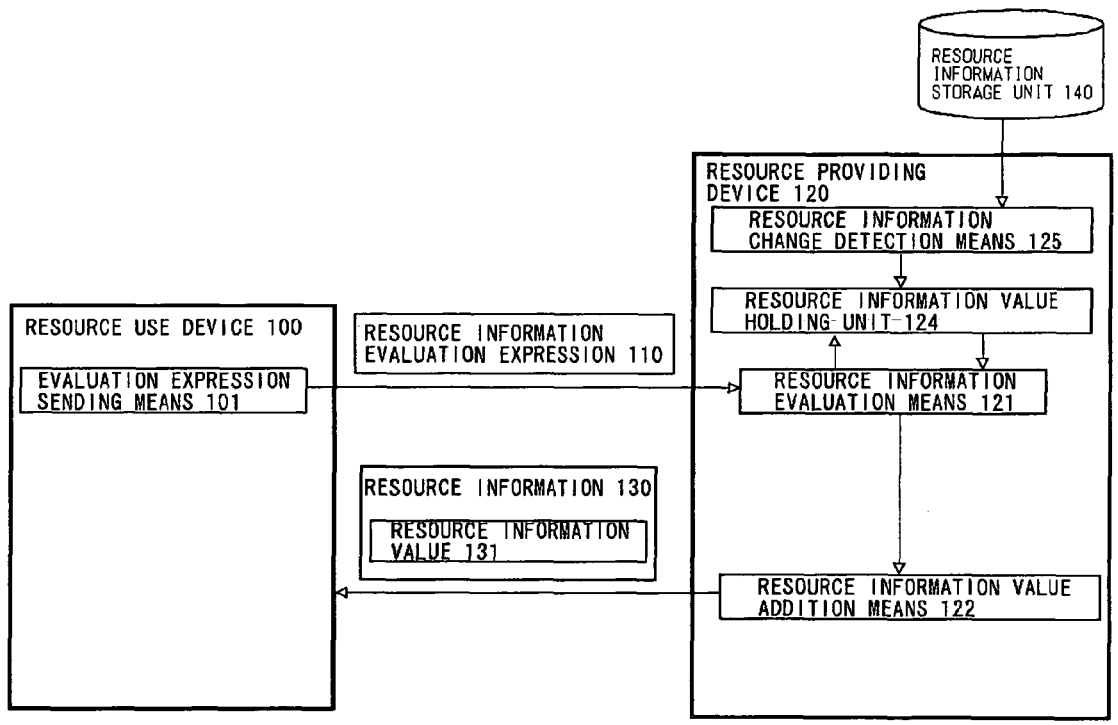
FIG. 13 is a block diagram showing the configuration of a fourth embodiment of the present invention.

Referring to FIG. 13, the fourth embodiment of the present invention differs from the first embodiment in that a resource providing device 120 further comprises a resource information value holding unit 124 and resource information change detection means 125.

The resource information value holding unit 124 is a cache device in which resource information values 131, produced as the evaluation result of a resource information evaluation expression 110 for resource information 130, are stored. For example, the resource information value holding unit 124 stores a resource information value list containing data such as the identifiers for identifying the resources and the resource information values calculated for the resource information, as shown in FIG. 14.

The resource information change detection means 125 is means for detecting a change in the attribute values of the resource information 130 provided by the resource providing device 120 when there is a change in the resource status or the environment and, upon detection of a change, for nullifying the resource information values 131 calculated for the resource information 130 and saved in the resource information value holding unit 124. One method for detecting a change in each attribute value of the resource information 130 is that each attribute of the resource information in the resource information storage unit 140 stores the data on the last update time, a resource information value in the resource information value holding unit 124 stores data on the time at which the value is registered, and those two are compared to detect a change. Another example of a method for detecting a change is to monitor the generation of an event that causes a change in the resource status.

Next, the general operation of this embodiment will be described in detail with reference to the configuration shown in FIG. 13 and the flowchart shown in FIG. 15.

Figure 15:
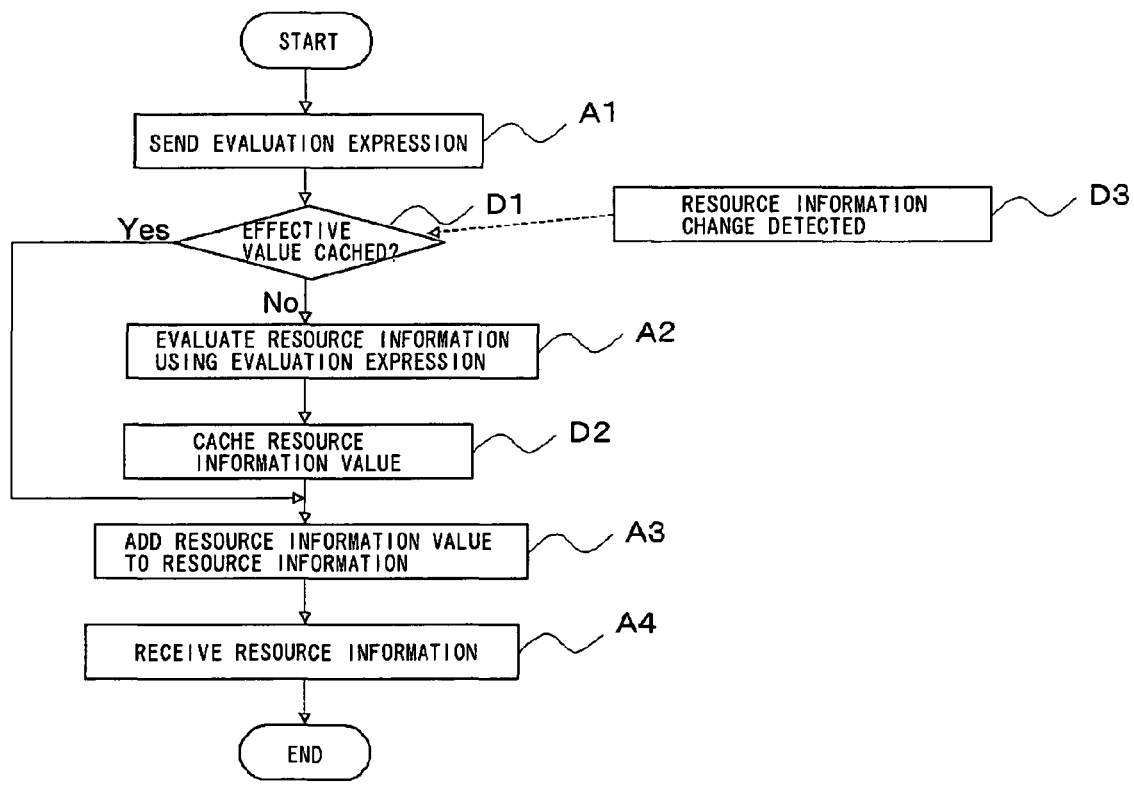
FIG. 15 is a flowchart showing the operation of the fourth embodiment of the present invention.

First, a resource use device 100 uses evaluation expression sending means 101 to send a resource information evaluation expression 110 to the resource providing device 120 (step A1 in FIG. 15).

Next, the resource providing device 120 uses resource information evaluation means 121 to search the resource information value holding unit 124 for resource information, stored in the resource information storage unit 140, using data such as the identifier identifying the resource information, for determining if an effective resource information value is cached (step D1 in FIG. 15). If such a value is cached, the resource providing device 120 adds the resource information value, read from the resource information value holding unit 124, to the resource information (step A3 in FIG. 15) and sends the resource information to the resource use device 100 (step A4 in FIG. 15).

On the other hand, if an effective resource information value is not cached, the resource providing device 120 uses the resource information evaluation means 121 to evaluate the resource information using the resource information evaluation expression 110 (step A2 in FIG. 15) and saves the calculated resource information value in the resource information value holding unit 124 (step D2 in FIG. 15). In addition, the resource providing device 120 adds the calculated resource information value to the resource information (step A3 in FIG. 15) and sends the resource information to the resource use device 100 (step A4 in FIG. 15).

If the resource status is changed, the resource information change detection means 125 detects the change and nullifies the resource information value cache entry saved in the resource information value holding unit 124 and corresponding to the resource information (step D3 in FIG. 15).

Figure 16:
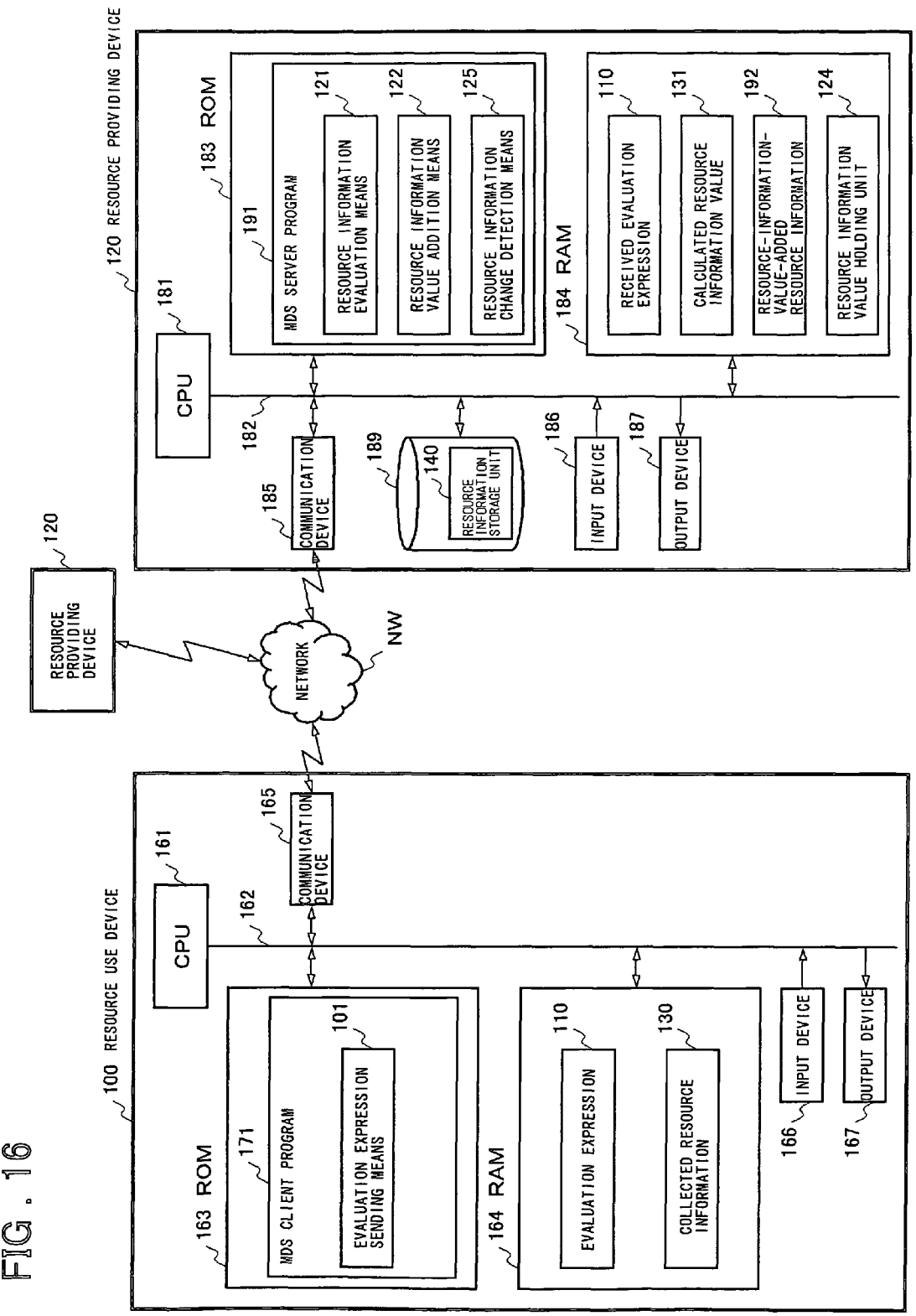
FIG. 16 is a block diagram showing the detailed configuration of a resource use device and a resource providing device in the fourth embodiment of the present invention.

FIG. 16 shows an example of the more detailed configuration of the resource use device 100 and the resource providing device 120 in this embodiment. As compared with the example of the configuration in FIG. 5, an MDS server program 191 stored in a ROM 183 of the resource providing device 120 includes the resource information change detection means 125, and an RAM 184 logically includes one or more resource information value holding units 124. An index is attached to a resource information value holding unit 124 to indicate which evaluation expression is currently used to produce the resource information values stored in the cache. Before calculating the value of resource information stored in the resource information storage unit 140 using a received resource information evaluation expression 110, the resource information evaluation means 121 checks if there is a resource information value holding unit 124 whose index indicates the evaluation expression 110. If there is such a resource information value holding unit 124, the resource information evaluation means 121 further searches the resource information value holding unit 124 using the identifier of the resource information. If the resource information value corresponding to the identifier of the resource information is stored, the resource information evaluation means 121 does not perform calculation using the evaluation expression 110 but continues the subsequent processing using the cached resource information value.

If there is a resource information value holding unit 124 corresponding to the received evaluation expression 110 but if an effective resource information value corresponding to the identifier of the resource information is not cached, the resource information evaluation means 121 uses the evaluation expression 110 to calculate the resource information value and stores the result in the resource information value holding unit 124. If there is no resource information value holding unit 124 in the RAM 184 corresponding to the received evaluation expression 110, the resource information evaluation means 121 initializes an already-existing resource information value holding unit 124 corresponding to some other evaluation expression to use it as a resource information value holding unit 124 corresponding to the received evaluation expression 110, or generates a new resource information value holding unit 124 in the RAM 184 to store the calculated resource information value.

In this embodiment, the resource information value is re-calculated only when the resource information is changed as described above. This makes the resource information value calculation more effective.

Next, a fifth embodiment of the present invention will be described in detail with reference to the drawings.

Figure 17:
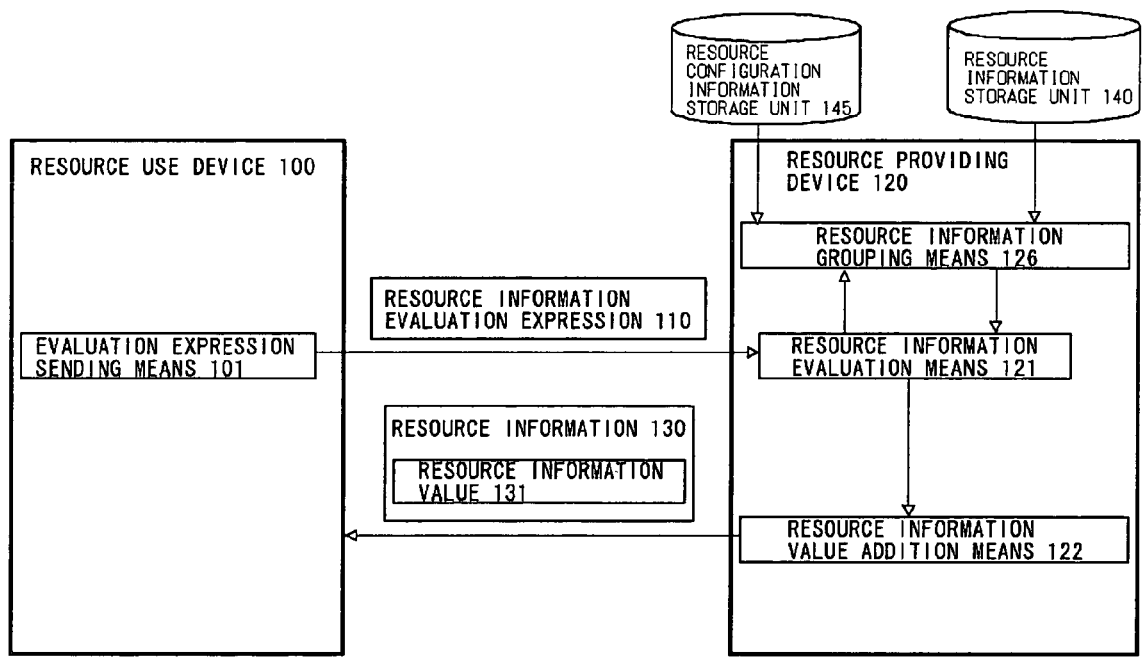
FIG. 17 is a block diagram showing the configuration of a fifth embodiment of the present invention.

Referring to FIG. 17, the fifth embodiment of the present invention differs from the first embodiment in that a resource configuration information storage unit 145 is connected to a resource providing device 120 and the resource providing device 120 further comprises resource information grouping means 126.

The resource configuration information storage unit 145 stores resource configuration information indicating how the resources, whose resource information is stored in a resource information storage unit 140, are related and configured. This information is stored as a list of resources with the same attribute value, for example, as shown in FIG. 18. Instead, the information can also be stored as a list of resources related to some specific resource as in a list of host machines connected to the same hub.

The resource information grouping means 126 is means for grouping resources, whose attribute values of resource information 130 provided by the resource information storage unit 140 are the same, by referencing the resource configuration information storage unit 145. For example, the resource information grouping means 126 is implemented by HashMap where a list of a set of an attribute and an attribute value is used as the key and a resource information value corresponding to the key is the value.

Figure 19:
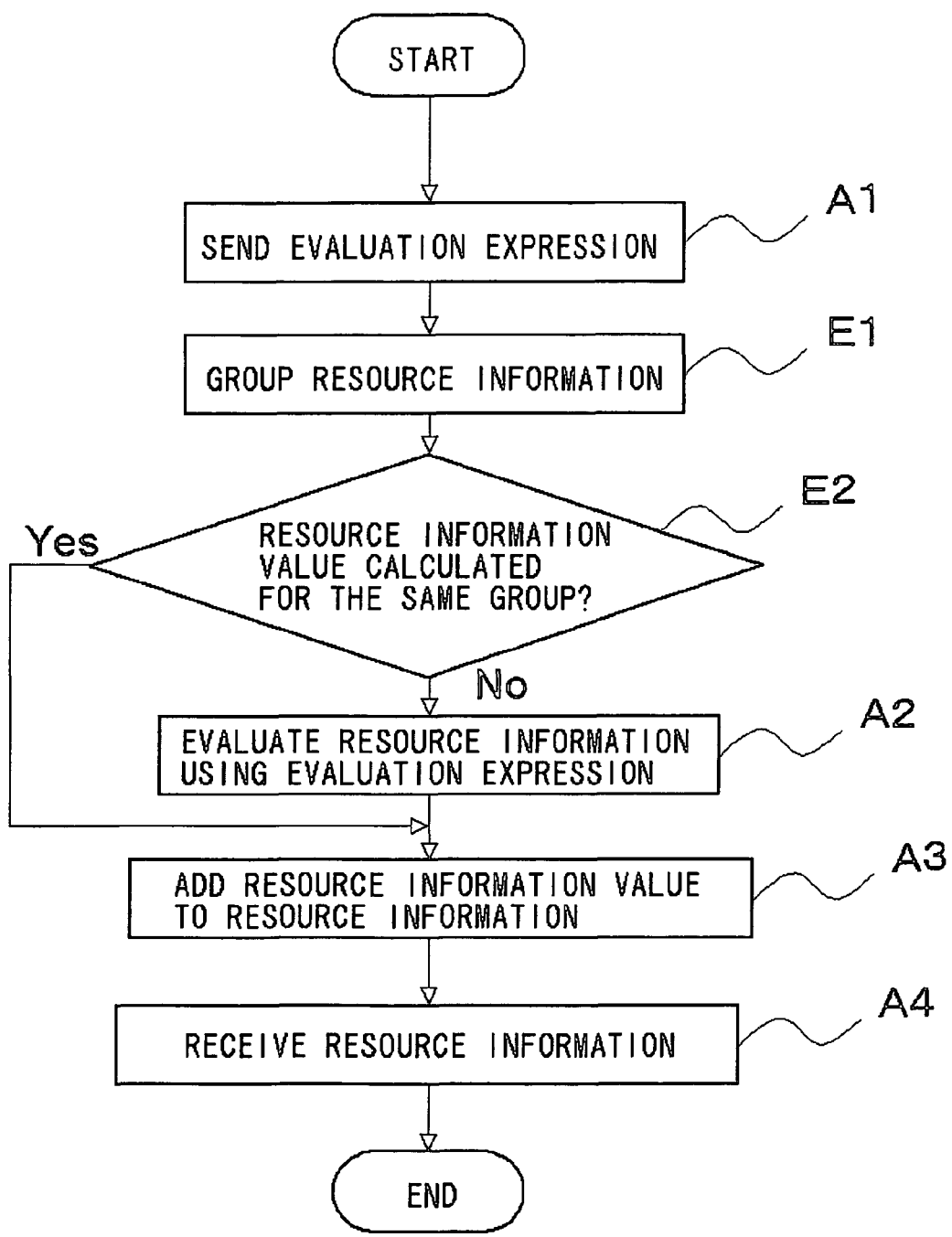
FIG. 19 is a flowchart showing the operation of the fifth embodiment of the present invention.

Next, the following describes the general operation of this embodiment in detail with reference to the configuration shown in FIG. 17 and the flowchart shown in FIG. 19.

First, a resource use device 100 uses an evaluation expression sending means 101 to send a resource information evaluation expression 110 to the resource providing device 120 (step A1 in FIG. 19).

Next, based on the attributes of resource information appearing in the resource information evaluation expression 110 received from the resource use device 100 and the resource configuration information stored in the resource configuration information storage unit 145, the resource providing device 120 uses the resource information grouping means 126 to relate resource information, whose resource information attributes are the same value, for grouping the resource information (step E1 in FIG. 19). For example, assume that "Attribute A1+2×Attribute A2" is given as the evaluation expression 110. Because two attributes, A1 and A2, are included in this evaluation expression 110, all resource information stored in the resource information storage unit 140 is classified into groups of resource information each having the same attribute value for Attribute A1 and Attribute A2. By grouping resource information as described above, the resource information value is required to be calculated only for one piece of resource information of each group. Because the calculation value for other resource information of the same group is the same, the calculation for other resource information can be omitted.

For the resource information stored in the resource information storage unit 140, the resource providing device 120 checks if a resource information value has already been calculated using the evaluation expression 110 for the resource information in the same group (step E2 in FIG. 19). If the resource information value is already calculated, the resource providing device 120 adds the calculated result to the resource information (step A3 in FIG. 19) and sends the resource information to the resource use device 100 (step A4 in FIG. 19). On the other hand, if the resource information value is not yet calculated, the resource providing device 120 uses the evaluation expression 110 to calculate the resource information value (step A2 in FIG. 19), stores the calculated resource information value as the resource information value of the group, adds the resource information value to the resource information (step A3 in FIG. 19), and sends the resource information to the resource use device 100 (step A4 in FIG. 19).

Figure 20:
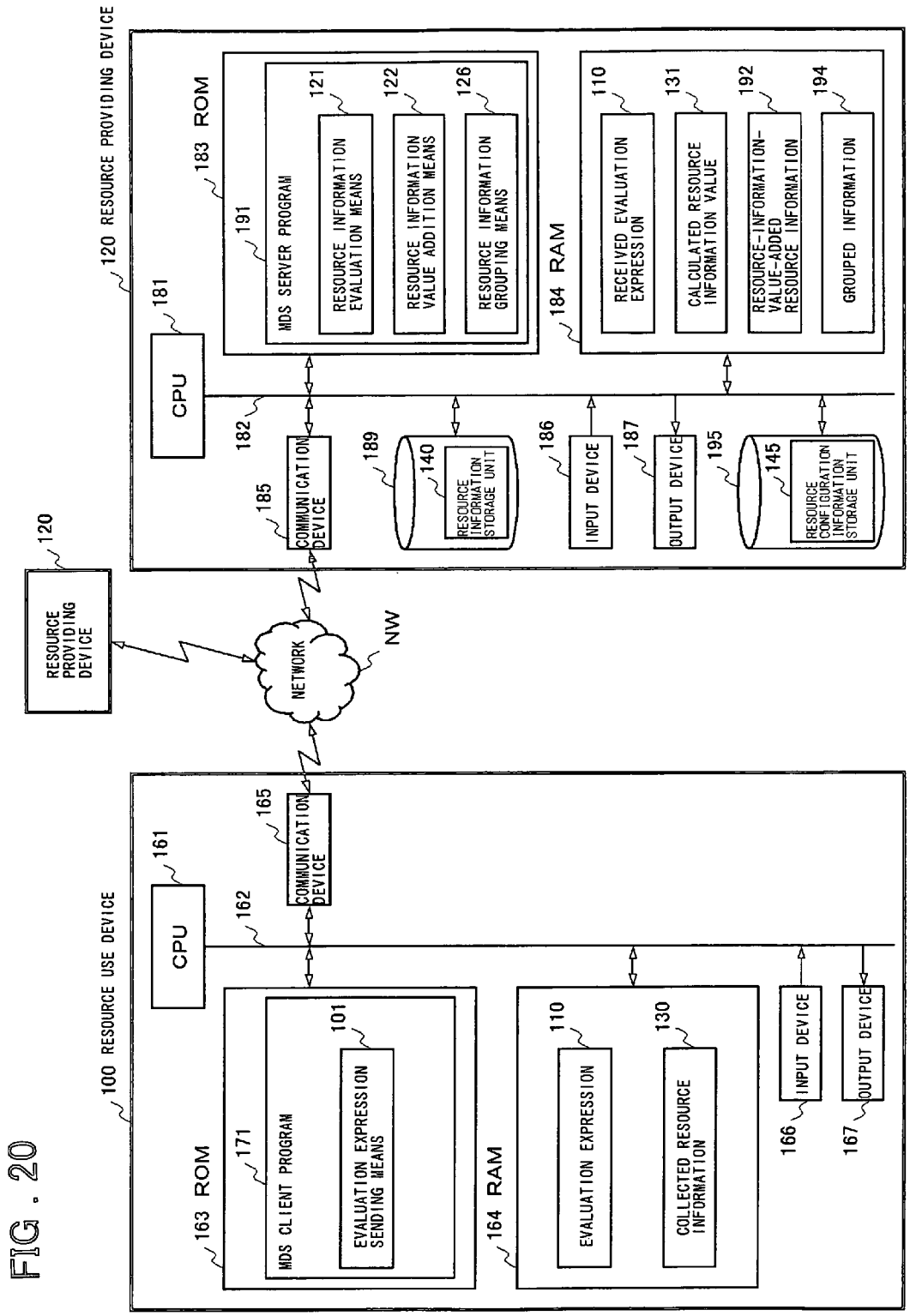
FIG. 20 is a block diagram showing the detailed configuration of a resource use device and a resource providing device in the fifth embodiment of the present invention.

FIG. 20 shows an example of the detailed configuration of the resource use device 100 and the resource providing device 120 in this embodiment. As compared with the configuration shown in FIG. 5, a hard disk drive 195 used as the resource configuration information storage unit 145 is provided, the resource information grouping means 126 is included in an MDS server program 191 stored in a ROM 183 of the resource providing device 120, and the grouped information 194 of the resource information grouped by the resource information grouping means 126 is stored in a RAM 184. This grouped information 194 records therein the identifiers identifying the resources belonging to each group and the calculated resource information values. Before calculating the value of resource information stored in the resource information storage unit 140 using the received evaluation expression 110, the resource information evaluation means 121 references the grouped information 194 grouped by the resource information grouping means 126 according to the type of an attribute included in the evaluation expression 110, and checks the group, to which the resource whose resource information value is to be calculated belongs, if a resource information value has already been calculated. If the resource information value is already calculated, the resource information evaluation means 121 uses that value; if the resource information value is not yet calculated, the resource information evaluation means 121 uses the evaluation expression 110 to calculate the resource information value and records the result in the grouped information 194.

In this embodiment, the resource information stored in the resource information storage unit 140 is classified into groups each having the same value of an attribute appearing in the evaluation expression (that is, the same resource information value). This reduces the amount of resource information value calculation for increasing the efficiency of resource information evaluation.

In this embodiment, the resource information grouping means 126 references the resource configuration information storage unit 145, in which a list of resource groups each having the same attribute value is stored, and classifies the resource information, stored in the resource information storage unit 140, into groups each having the same value of an attribute appearing in the evaluation expression 110. Alternatively, it is also possible not to use the resource configuration information storage unit 145 but to classify the resource information into groups by referencing the value of each attribute of the resource information stored in the resource information storage unit 140.

Next, a sixth embodiment of the present invention will be described in detail with reference to the drawings.

Figure 21:
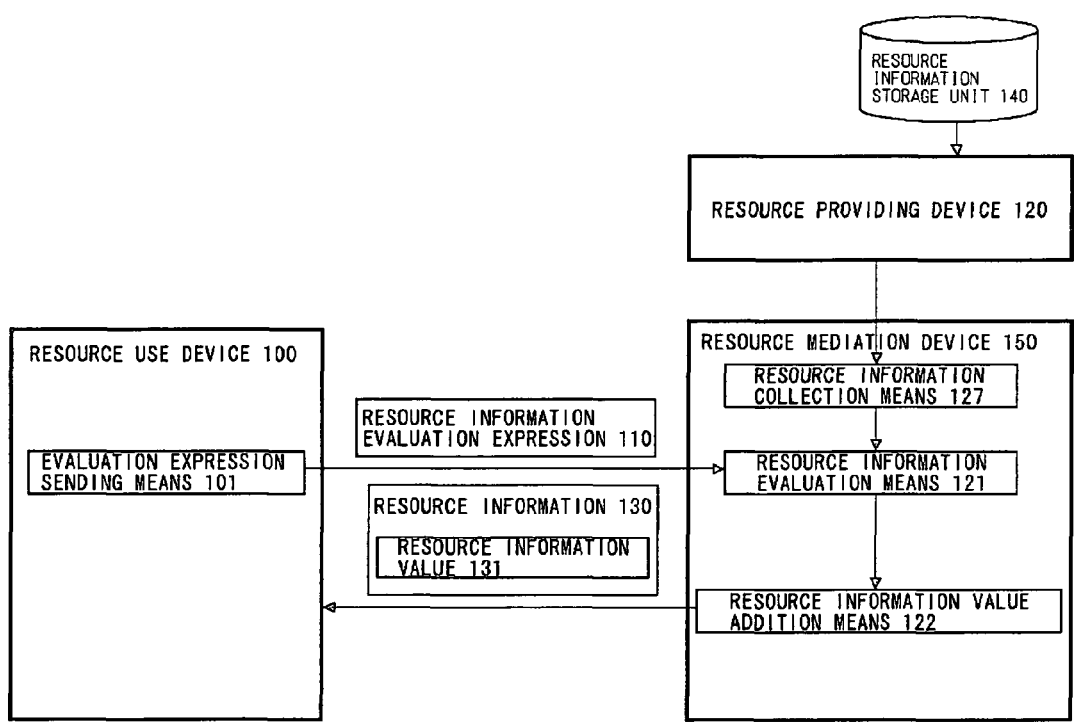
FIG. 21 is a block diagram showing the configuration of a sixth embodiment of the present invention.

Referring to FIG. 21, the sixth embodiment of the present invention differs from the first embodiment in that a resource mediation device 150 is provided between a resource use device 100 and a resource providing device 120.

The resource mediation device 150 comprises resource information evaluation means 121 and resource information value addition means 122 that are the same as those in the resource providing device 120 in the first embodiment and further comprises resource information collection means 127.

The resource information collection means 127 is means used by the resource mediation device 150 for collecting resource information 130 from the resource providing device 120 via a network not shown.

In this embodiment, the resource providing device 120 does not have to include resource information evaluation means 121 and resource information value addition means 122 provided in the first embodiment.

Figure 22:
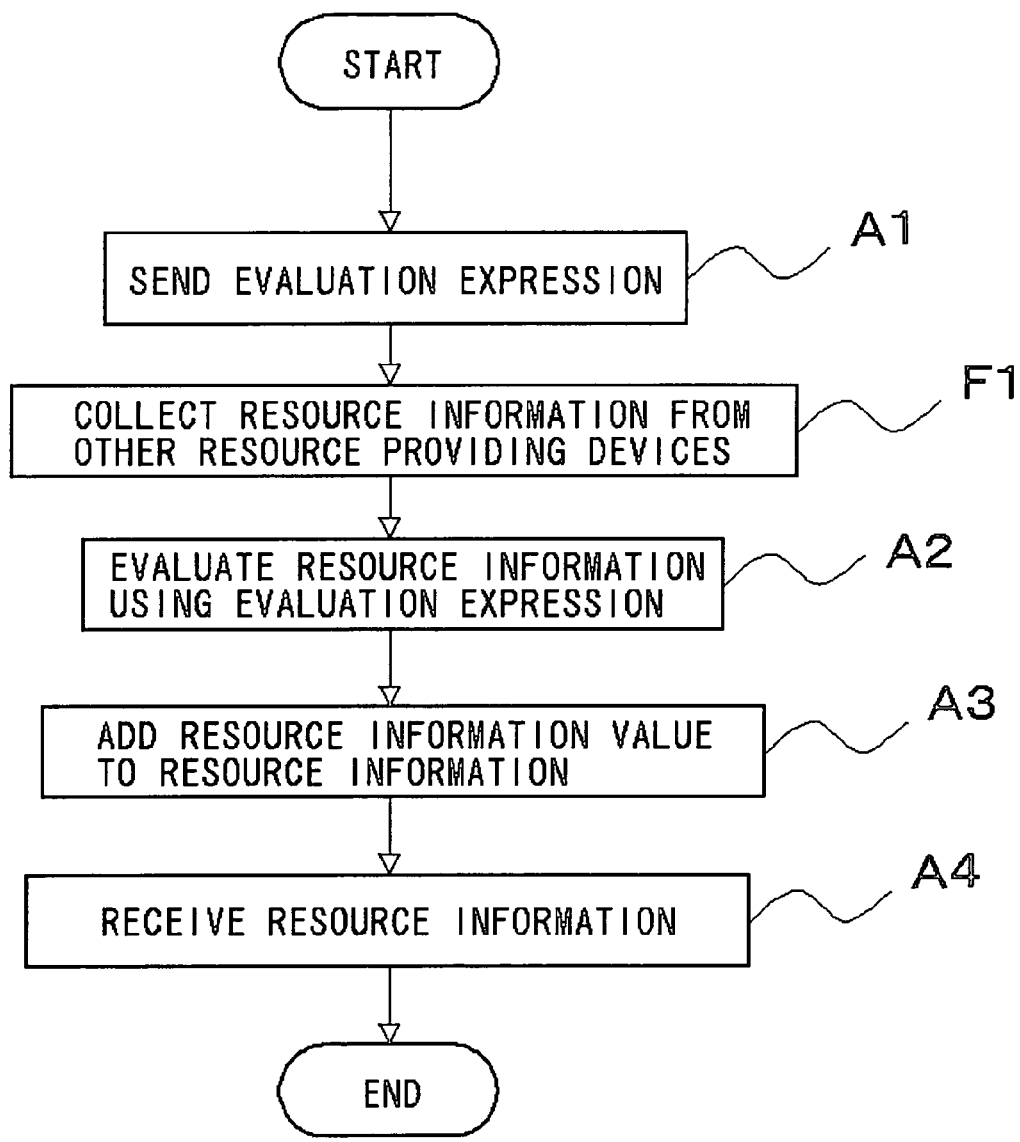
FIG. 22 is a flowchart showing the operation of the sixth embodiment of the present invention.

Next, the following describes the general operation of this embodiment in detail with reference to the configuration shown in FIG. 21 and the flowchart shown in FIG. 22.

First, the resource use device 100 uses evaluation expression sending means 101 to send a resource information evaluation expression 110 to the resource mediation device 150 (step A1 in FIG. 22).

Next, the resource mediation device 150 uses the resource information collection means 127 to collect resource information from the resource providing device 120 (step F1 in FIG. 22). Next, the resource mediation device 150 uses the resource information evaluation means 121 to evaluate the collected resource information using the resource information evaluation expression 110 (step A2 in FIG. 22). Next, the resource providing device 120 uses resource information value addition means 122 to add a resource information value 131, calculated by the resource information evaluation means 121, to the resource information 130 (step A3 in FIG. 22) and sends the resource information 130 to the resource use device 100, and the resource use device 100 receives it (step A4 in FIG. 22).

Figure 23:
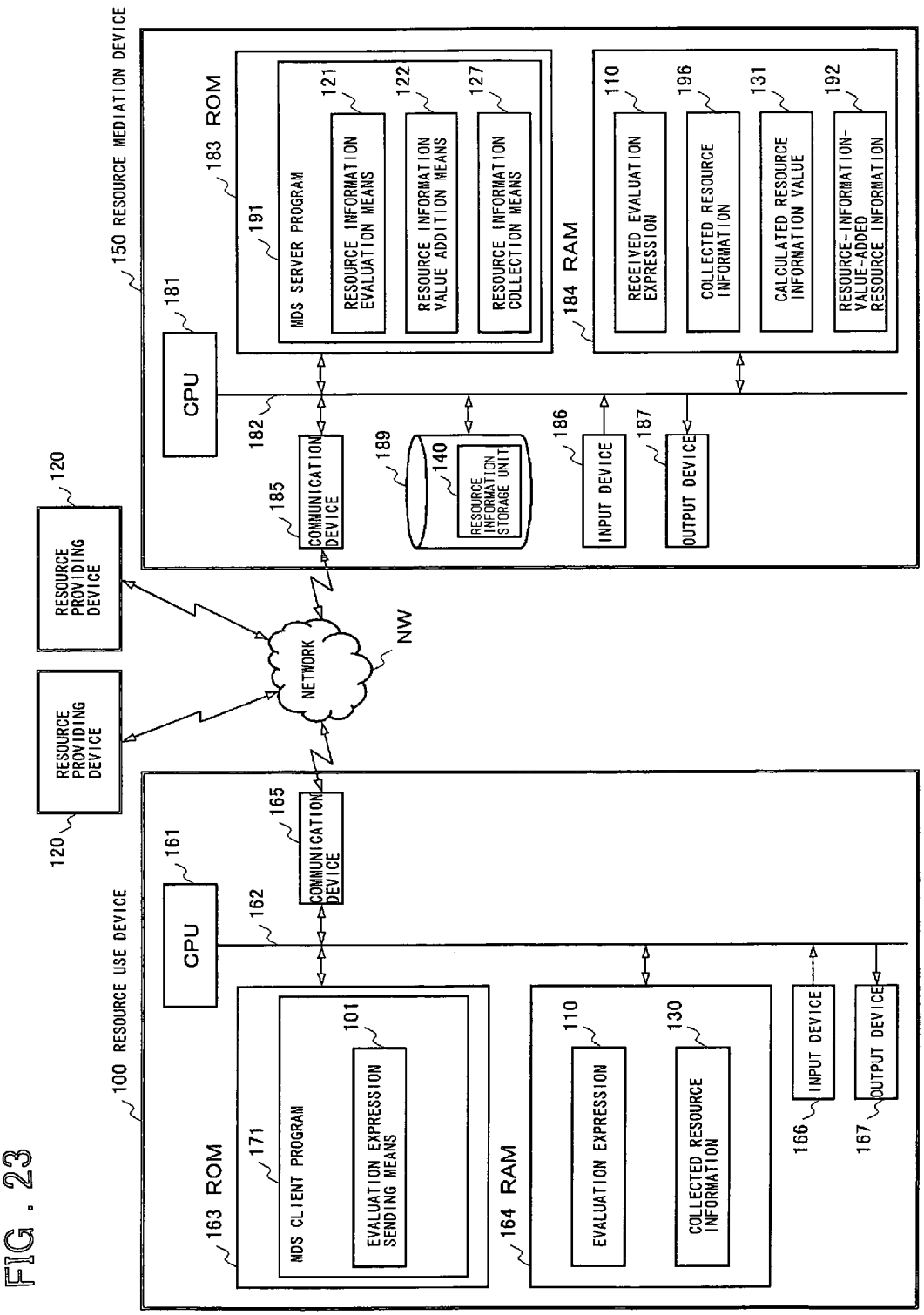
FIG. 23 is a block diagram showing the detailed configuration of a resource use device and a resource mediation device in the sixth embodiment of the present invention.
Figure 24:
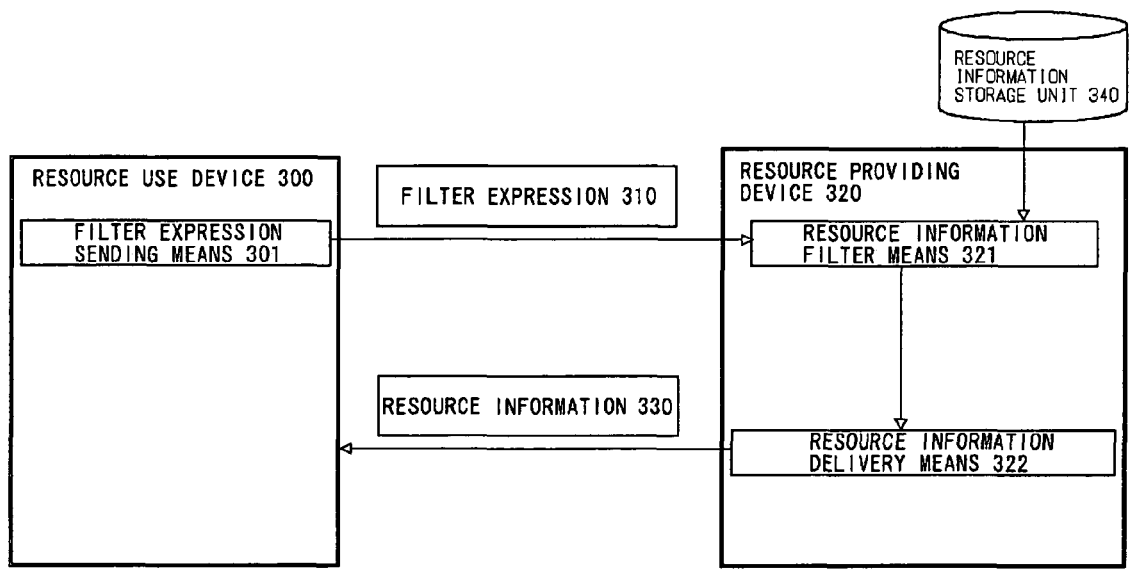
FIG. 24 is a block diagram showing a conventional resource information collection and delivery system.

FIG. 23 shows an example of the detailed configuration of the resource use device 100 and the resource mediation device 150. The configuration of the resource mediation device 150 is almost similar to that of the resource providing device 120 in FIG. 5 except that the resource information collection means 127 is included in an MDS server program 191 stored in a ROM 183 and an area is provided in a RAM 184 to store resource information 196 collected by the resource information collection means 127 from other resource providing devices 120.

The resource mediation device 150 used in this embodiment delivers resource information, to which a resource information value is added, to the resource use device 100 without calculating the resource information value in the resource providing device 120, thus achieving the same effect as that in the first embodiment.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A resource information collection and delivery system comprising:
   at least one resource management device that has a resource information storage unit in which resource information on resources related to grid computing is stored; and
   a resource use device that uses at least one of the resources, wherein
   said resource information includes multiple pairs of resource attribute names and a resource attribute value corresponding to each of the resource attribute names,
   said resource use device is configured to send an evaluation expression to said resource management device, said evaluation expression is a weighted sum of the resource attribute names and determines a value of the resource information, and
   said resource management device is configured to:
      evaluate a value of the resource information by substituting the resource attribute values for the resource attribute names in the evaluation expression to produce a resource information value; and
      add the resource information value to accompany the resource information to be delivered to said resource use device.

2. The resource information collection and delivery system as defined by claim 1, wherein
   said resource management device is further configured to sort the resource information, which will be delivered to said resource use device, based on a sequential relationship of the resource information value added to the resource information and
   said resource use device is further configured to request said resource management device to stop delivery when a predetermined amount of resource information is collected from said resource management device.

3. The resource information collection and delivery system as defined by claim 1 wherein
   said resource use device is further configured to:
   store sets each composed of a resource information value added to delivered resource information and information on a resource management device from which the resource information is provided; and
   select a resource management device, from which resource information is collected, by referencing said resource information value storage unit.

4. The resource information collection and delivery system as defined by claim 1 wherein
   said resource management device also stores the resource information value; and said resource management device is further configured to nullify the resource information value of the resource information when an attribute of the resource information is changed, and wherein,
   for the resource information whose resource information value is stored, said resource management device is configured to omit evaluation using the evaluation expression but uses the resource information value as an evaluation result.

5. The resource information collection and delivery system as defined by claim 1 wherein
   said resource management device is further configured to classify said stored resource information so that resource information having the same value of an attribute, included in the evaluation expression, belongs to the same group and
   when resource information is evaluated using the evaluation expression, said resource management device checks if there is a resource information value, already calculated using the evaluation expression, for resource information belonging to the same group to which the resource information belongs and, if there is such a value, uses the already-calculated resource information value as the evaluation result.

6. A resource information collection and delivery system comprising:
   at least one resource management device that has a resource information storage unit in which resource information on resources related to grid computing is stored, said resource information including multiple pairs of resource attribute names and a resource attribute value corresponding to each of the resource attribute names;
   a resource use device that uses the resource; and
   a resource mediation device provided between said resource management device and said resource use device, wherein
   said resource use device is configured to send an evaluation expression to said resource mediation device, said evaluation expression is a weighted sum of the resource attribute names and determines a value of the resource information, and
   said resource mediation device is configured to collect the resource information from said resource management device; evaluate a value of the collected resource information by substituting the resource attribute values for the resource attribute names in the evaluation expression to produce a resource information value; and add the resource information value to resource information to be delivered to said resource use device.

7. A resource information collection and delivery method comprising the steps of:
   (a) sending, by a resource use device that uses a resource related to grid computing, an evaluation expression to a resource management device having a resource information storage unit in which resource information on the resource is stored, said resource information including multiple pairs of resource attribute names and a resource attribute value corresponding to each of the resource attribute names, and said evaluation expression is a weighted sum of the resource attribute names and determines a value of resource information;

(b) evaluating, by said resource management device, the value of the resource information by substituting the resource attribute values for the resource attribute names in the evaluation expression to produce a resource information value; and (c) adding, by said resource management device, the resource information value to the resource information and delivering the resource information to said resource use device.

8. A resource information collection and delivery method comprising the steps of:

(a) sending, by a resource use device that uses a resource related to grid computing, an evaluation expression to a resource management device having a resource information storage unit in which resource information on the resource is stored, said resource information including multiple pairs of resource attribute names and a resource attribute value corresponding to each of the resource attribute names, and said evaluation expression is a weighted sum of the resource attribute names and determines a value of resource information;

(b) evaluating, by said resource management device, the value of the resource information by substituting the resource attribute values for the resource attribute names in the evaluation expression to produce a resource information value;

(c) adding, by said resource management device, the resource information value to the resource information;

(d) sorting, by said resource management device, the resource information based on a sequential relationship of the resource information value added to the resource information and delivering the sorted resource information to said resource use device; and (e) requesting, by said resource use device, said resource management device to stop the delivery when a predetermined amount of resource information is collected from said resource management device.

9. A resource information collection and delivery method comprising the steps of:

(a) referencing, by a resource use device that uses a resource related to grid computing, a resource information value storage unit so as to select a resource management device from which resource information is to be collected, said resource information including multiple pairs of resource attribute names and a resource attribute value corresponding to each of the resource attribute names, and said resource information value storage unit having stored therein sets each composed of a resource information value added to resource information delivered in the past and information on a resource management device from which the resource information was provided;

(b) sending, by said resource use device, an evaluation expression to said selected resource management device said evaluation expression being a weighted sum of the resource attribute names and determines a value of resource information;

(c) calculating, by said resource management device, the value of the resource information by substituting the resource attribute values for the resource attribute names in the evaluation expression to produce an updated resource information value;

(d) adding, by said resource management device, the updated resource information value to the resource information and delivering updated resource information to said resource use device; and (e) storing, by said resource use device in said resource information value storage unit, said updated resource information delivered from said resource management device.

10. A resource information collection and delivery method comprising the steps of:

(a) sending, by a resource use device that uses a resource related to grid computing, an evaluation expression to a resource management device having a resource information storage unit in which resource information on the resource is stored, said resource information including multiple pairs of resource attribute names and a resource attribute value corresponding to each of the resource attribute names, and said evaluation expression is a weighted sum of the resource attribute names and determines a value of resource information;

(b) referencing, by said resource management device, said resource information storage unit to check if past evaluation results can be used, said resource information storage unit storing therein resource information values that are a result produced by evaluating the resource information using the evaluation expression;

(c) if it is determined that the past evaluation results cannot be used, evaluating, by said resource management device, the resource information by substituting the resource attribute values for the resource attribute names in the evaluation expression and saving a result in said resource information storage unit;

(d) adding, by the resource management device, the result of the evaluation to the resource information and delivering the resource information to said resource use device; and (e) nullifying, by the resource management device, the resource information value of the resource information held in said resource information storage unit when an attribute of said resource information is changed.

11. A resource information collection and delivery method comprising the steps of:

(a) sending, by a resource use device that uses a resource related to grid computing, an evaluation expression to a resource management device having a resource information storage unit in which resource information on the resource is stored, said resource information including multiple pairs of resource attribute names and a resource attribute value corresponding to each of the resource attribute names, and said evaluation expression is a weighted sum of the resource attribute names and determines a value of resource information;

(b) classifying, by said resource management device, resource information stored in said resource information storage unit into groups each composed of resource information having the same value for an attribute included in said evaluation expression;

(c) evaluating, by said resource management device, a value of one piece of resource information belonging to the group by substituting the resource attribute values for the resource attribute names in the evaluation expression to produce a resource information value and, for other pieces of resource information belonging to the same group, using the resource information value; and (d) adding, by said resource management device, the resource information value to the resource information and delivering the resource information to said resource use device.

12. A resource information collection and delivery method comprising the steps of:

(a) sending, by a resource use device that uses a resource related to grid computing, an evaluation expression to a resource mediation device, said resource information including multiple pairs of resource attribute names and a resource attribute value corresponding to each of the resource attribute names, and said evaluation expression is a weighted sum of the resource attribute names and determines a value of resource information;

(b) collecting, by said resource mediation device, resource information from a resource management device having a resource information storage unit in which resource information on the resource is stored;

(c) evaluating, by said resource mediation device, the value of the collected resource information by substituting the resource attribute values for the resource attribute names in the evaluation expression to produce a resource information value; and (d) adding, by said resource mediation device, the resource information value to the resource information and delivering the resource information to said resource use device.

13. A resource management device that has a resource information storage unit in which resource information on resources related to grid computing is stored, said resource information including multiple pairs of resource attribute names and a resource attribute value corresponding to each of the resource attribute names, the resource management device comprising:

a resource information evaluation unit that receives an evaluation expression from a resource use device that uses the resources and calculates a value of the resource information by substituting the resource attribute values for the resource attribute names in the evaluation expression to produce a resource information value, said evaluation expression being a weighted sum of the resource attribute names and determines a value of the resource information; and resource information value addition means for adding the resource information value to resource information to be delivered to said resource use device.

14. The resource management device as defined by claim 13, further comprising a resource information sorter that sorts the resource information, which will be delivered to said resource use device, based on a sequential relationship of the resource information value added to the resource information.

15. The resource management device as defined by claim 13, further comprising:

the resource information storage unit holding the resource information value; and a resource information change detector that nullifies the resource information value of the resource information held in said resource information storage unit when an attribute of the resource information is changed, wherein for the resource information whose resource information value is held in said resource information storage unit, said resource information evaluation unit omits evaluation using the evaluation expression but uses the resource information value, which is held, as an evaluation result.

16. The resource management device as defined by claim 13, further comprising:

a resource information grouper that classifies resource information stored in said resource information storage unit so that resource information having the same value of an attribute, included in the evaluation expression, belongs to the same group, wherein when resource information is evaluated using the evaluation expression, said resource information evaluation unit checks if there is a resource information value, already calculated using the evaluation expression, for resource information belonging to the same group to which the resource information belongs and, if there is such a value, uses the already-calculated resource information value as the evaluation result.

17. A resource mediation device provided between at least one resource management device having a resource information storage unit in which resource information on resources related to grid computing is stored and a resource use device that uses the resources, said resource information including multiple pairs of resource attribute names and a resource attribute value corresponding to each of the resource attribute names, said resource mediation device comprising:

a resource information collector that collects the resource information from said resource management device;

a resource information evaluation unit that receives an evaluation expression from said resource use device and calculates a value of the collected resource information by substituting the resource attribute values for the resource attribute names in the evaluation expression, said evaluation expression being a weighted sum of the resource attribute names and determines the value of the collected resource information; and a resource information value adder that adds a resource information value, which is the evaluation result produced by said resource information evaluation unit, to resource information to be delivered to said resource use device.

18. A resource use device comprising:

an evaluation expression sending unit that sends an evaluation expression to a resource management device having a resource information storage unit in which resource information on resources related to grid computing is stored, said resource information including multiple pairs of resource attribute names and a resource attribute value corresponding to each of the resource attribute names, and said evaluation expression is a weighted sum of the resource attribute names and determines a value of resource information by substituting the resource attribute values for the resource attribute names in the evaluation expression to produce a resource information value, wherein said resource use device is configured to receive updated resource information, to which the resource information value has been added, from said resource management device.

19. The resource use device as defined by claim 18, further comprising:

a delivery stopping unit that receives the updated resource information delivered from said resource management device in order of a sequential relationship of the resource information value and for requesting said resource management device to stop delivery when a predetermined amount of resource information is collected.

20. The resource use device as defined by claim 18, further comprising:

a resource information value storage unit storing therein sets each composed of a resource information value added to delivered resource information and information on a resource management device from which the resource information is provided; and a management device selection unit that selects a resource management device, from which resource information is collected, by referencing said resource information value storage unit.

21. A non-transitory computer-readable storage medium for causing a computer, which constitutes a resource management device that has a resource information storage unit in which resource information on resources related to grid computing is stored, said resource information including multiple pairs of resource attribute names and a resource attribute value corresponding to each of the resource attribute names, to perform the following:
 a resource information evaluation step of receiving an evaluation expression from a resource use device that uses the resources and calculating a value of the resource information by substituting the resource attribute values for the resource attribute names in the evaluation expression to produce a resource information value, said evaluation expression being a weighted sum of the resource attribute names and determines the value of the resource information; and
 a resource information value addition step of adding the resource information value to the resource information to be delivered to said resource use device.

22. The non-transitory computer-readable storage medium as defined by claim 21, further causing said computer to perform: a resource information sorting step of sorting the resource information, which will be delivered to said resource use device, based on a sequential relationship of the resource information value added to the resource information.

23. The non-transitory computer-readable storage medium as defined by claim 21, further causing said computer to perform: a resource information change detection step of nullifying the resource information value of resource information held in said resource information storage unit when an attribute of the resource information is changed, said resource information storage unit holding therein the resource information value, wherein
 for the resource information whose resource information value is held in said resource information storage unit, said resource information evaluation means omits evaluation using the evaluation expression but uses the resource information value.

24. The non-transitory computer-readable storage medium as defined by claim 21, further causing said computer to perform: a resource information grouping step of classifying resource information stored in said resource information storage unit so that resource information having the same value of an attribute, included in the evaluation expression, belongs to the same group, wherein
 when resource information is evaluated using the evaluation expression, said resource information evaluation step checks if there is an already-calculated resource information value for resource information belonging to the same group to which the resource information belongs and, if the already-calculated information value is present, uses the already-calculated resource information value in evaluating the resource information.

25. A non-transitory computer-readable storage medium for causing a computer, which constitutes a resource mediation device provided between at least one resource management device having a resource information storage unit in which resource information on resources related to grid computing is stored and a resource use device that uses the resources, to perform the following:
 a resource information collection step for collecting the resource information from said resource management device, said resource information including multiple pairs of resource attribute names and a resource attribute value corresponding to each of the resource attribute names;
 a resource information evaluation step of receiving an evaluation expression from said resource use device and calculating a value of the collected resource information by substituting the resource attribute values for the resource attribute names in the evaluation expression to produce a resource information value, said evaluation expression being a weighted sum of the resource attribute names and determines the value of the collected resource information; and
 a resource information value addition step of adding the resource information value to resource information to be delivered to said resource use device.

26. A non-transitory computer-readable storage medium for causing a computer, which constitutes a resource use device, to perform the following:
 an evaluation expression sending step for sending an evaluation expression to a resource management device having a resource information storage unit in which resource information on resources related to grid computing is stored, said resource information including multiple pairs of resource attribute names and a resource attribute value corresponding to each of the resource attribute names, said evaluation expression is a weighted sum of the resource attribute names and determines a value of resource information by substituting the resource attribute values for the resource attribute names in the evaluation expression to produce a resource information value, and
 a step of receiving the resource information, to which the resource information value is added, from said resource management device.

27. The non-transitory computer-readable storage medium as defined by claim 26, further comprising: a delivery stopping step of receiving the resource information delivered from said resource management device in order of a sequential relationship of the resource information value and for requesting said resource management device to stop delivery when a predetermined amount of the resource information is collected.

28. The non-transitory computer-readable storage medium as defined by claim 26, further comprising: a management device selection step of selecting a resource management device from which the resource information is collected by referencing a resource information value storage unit storing therein sets each composed of the resource information value added to delivered resource information and information on the resource management device from which the resource information is provided.

\* \* \* \* \*